(12) United States Patent
Guerra

(10) Patent No.: US 12,371,267 B2
(45) Date of Patent: ***Jul. 29, 2025

(54) CONVEYOR SYSTEMS WITH INTERNAL BANDS

(71) Applicant: Lewco, Inc., Sandusky, OH (US)

(72) Inventor: Gerald T. Guerra, Sandusky, OH (US)

(73) Assignee: LEWCO, INC., Sandusky, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,185

(22) Filed: Mar. 4, 2024

(65) Prior Publication Data

US 2024/0199338 A1    Jun. 20, 2024

Related U.S. Application Data

(63) Continuation of application No. 17/835,445, filed on Jun. 8, 2022, now Pat. No. 11,919,716.

(60) Provisional application No. 63/324,141, filed on Mar. 27, 2022.

(51) Int. Cl.
| | |
|---|---|
| *B65G 13/07* | (2006.01) |
| *B65G 13/11* | (2006.01) |
| *B65G 21/00* | (2006.01) |
| *B65G 39/09* | (2006.01) |

(52) U.S. Cl.
CPC .............. *B65G 13/07* (2013.01); *B65G 13/11* (2013.01); *B65G 21/00* (2013.01); *B65G 39/09* (2013.01)

(58) Field of Classification Search
CPC ......... B65G 13/07; B65G 21/00; B65G 39/09
USPC ....... 198/790, 781.03, 781.09, 781.1, 781.11
See application file for complete search history.

(56) References Cited

U.S. PATENT DOCUMENTS

| | | |
|---|---|---|
| 1,034,524 A | 8/1912 | Sjoegren |
| 2,493,479 A | 1/1950 | Smith |
| 4,264,005 A | 4/1981 | Smock |
| 4,421,224 A | 12/1983 | Dingman |
| 5,148,909 A | 9/1992 | Becker et al. |
| 5,361,894 A | 11/1994 | Solcz |

(Continued)

FOREIGN PATENT DOCUMENTS

| | | |
|---|---|---|
| EP | 1714917 A1 | 10/2006 |
| WO | 2023192040 A1 | 10/2023 |

OTHER PUBLICATIONS

"International Search Report and Written Opinion for PCT Patent Application No. PCT/US2023/015517", Mailed Date: Jun. 22, 2023, 10 pages.

(Continued)

*Primary Examiner* — Mark A Deuble
(74) *Attorney, Agent, or Firm* — CALFEE, HALTER & GRISWOLD LLP

(57) ABSTRACT

A conveyor system is configured to prevent objects from getting caught or pinched between rollers and belts. The system includes a base, frames on opposite sides of the base, a plurality of rollers each having a bearing, an attachment axle, a drive shaft, a drive belt connecting the draft shaft to one of the bearings, and connecting belts connecting the bearings. The bearings may be disposed between the frames such that the drive belt and connecting belts are protected between the frames or may be disposed within the frames such that the drive belt and connecting belts are protected within the frame when a cover is attached to the frame.

20 Claims, 18 Drawing Sheets

(56) References Cited

U.S. PATENT DOCUMENTS

| | | | |
|---|---|---|---|
| 6,412,623 B2 * | 7/2002 | Axmann | B65G 13/11 |
| | | | 198/791 |
| 6,516,940 B1 | 2/2003 | Hart et al. | |
| 6,585,107 B1 * | 7/2003 | Specht | B65G 13/07 |
| | | | 198/781.09 |
| 8,371,435 B2 | 2/2013 | Agnoff | |
| 8,408,384 B2 * | 4/2013 | Rogers | B65G 13/075 |
| | | | 198/781.08 |
| 9,550,625 B2 | 1/2017 | Specht | |
| 9,643,784 B2 | 5/2017 | Guerra | |
| 10,988,314 B2 | 4/2021 | Guerra et al. | |
| 11,919,716 B2 | 3/2024 | Guerra | |

OTHER PUBLICATIONS

"Office Action for U.S. Appl. No. 17/835,445", Mailed Date: Aug. 25, 2023, 8 pages.
"Response to the Office Action for U.S. Appl. No. 17/835,445", filed Oct. 4, 2023, 9 pages.
"Notice of Allowance and Fees Due for U.S. Appl. No. 17/835,445", Mailed Date: Nov. 3, 2023, 7 pages.
International Preliminary Report on Patentability for PCT Application No. PCT/US2023/015517, Mailed Date: Sep. 24, 2024, 6 pages.

* cited by examiner

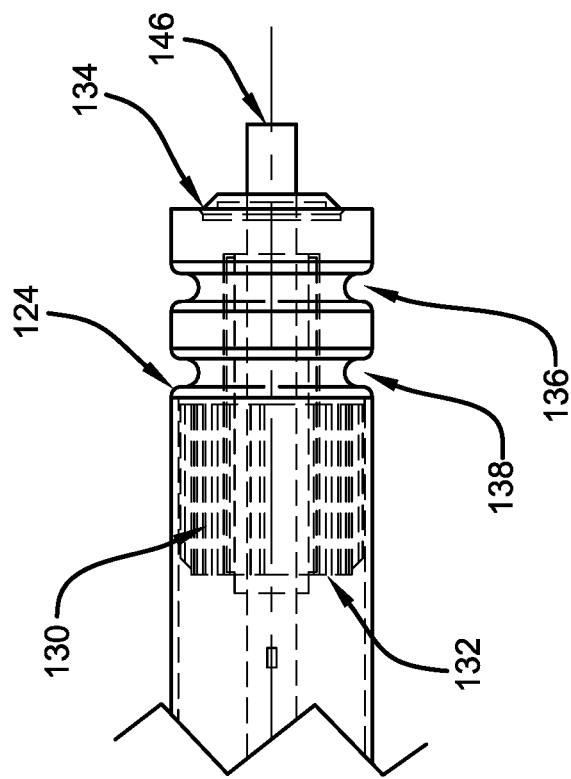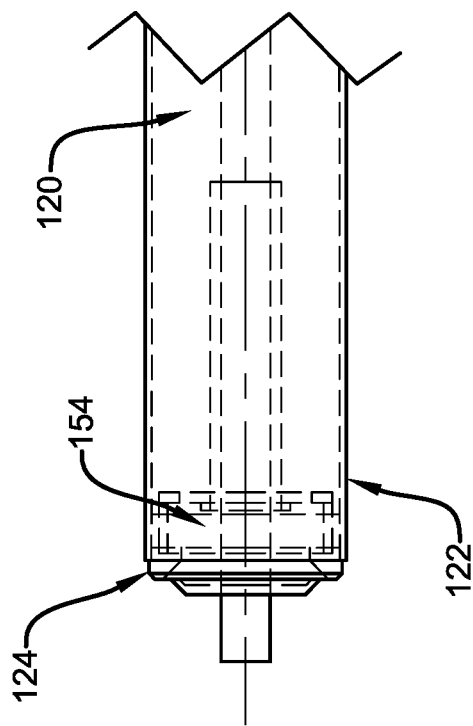
FIG. 4

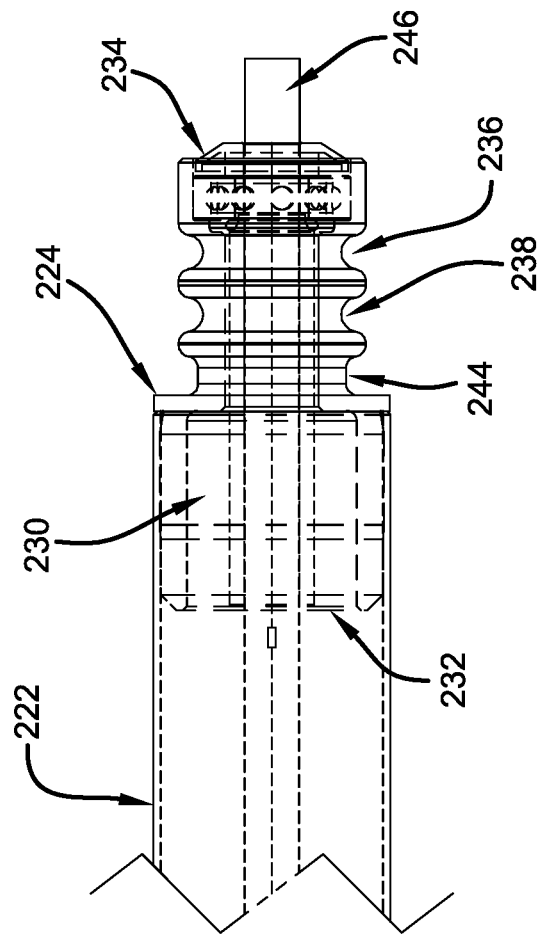
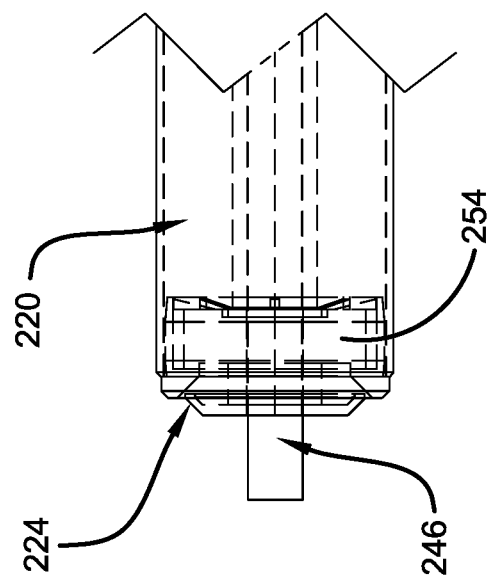
FIG. 16

CONVEYOR SYSTEMS WITH INTERNAL BANDS

RELATED APPLICATIONS

This application is a continuation of U.S. patent application Ser. No. 17/835,445, filed on Jun. 8, 2022, and entitled "CONVEYOR SYSTEMS WITH INTERNAL BANDS", which claims priority to U.S. Provisional Patent Application No. 63/324,141, filed on Mar. 27, 2022, and entitled "CONVEYOR SYSTEMS WITH INTERNAL BANDS"; the entireties of the foregoing are incorporated herein by reference.

TECHNICAL FIELD

The present application relates generally to conveyor systems and, more particularly, to conveyor systems having bands internal to the frame.

BACKGROUND OF THE INVENTION

Conveyor systems have been used in a variety of locations, such as warehouses and distribution centers, to more efficiently move or convey objects or packages, such as to prepare the objects or packages for sorting or shipment. Usual conveyor systems are either gravity fed such that objects or packages may move or roll down the conveyor system due to gravity or are motorized such that a motor-driven component, such as a roller, may rotate and thereby move or roll the object along the conveyor system. Typical motorized conveyor systems have two or more parallel rollers connected together by a series of O-ring belts which cause the rotation of one or more rollers. The conveyor systems typically have a drive shaft connected to one of the rollers, such as via an O-ring belt which translates the rotational motion of the drive shaft to the connected roller, and a plurality of O-ring belts connecting successive pairs of rollers so that the rotational motion of one of the rollers may translate to rotational movement for each roller connected in the chain. Accordingly, a single motor may provide the rotational movement to all of the rollers in a chain to move or roll an object or package along the conveyor.

Typically, the O-rings or other connecting belts which connect the drive shaft and rollers in a motorized conveyor system are disposed on the sides of the conveyor system, such as at the ends of the rollers, and/or over the tops of the rollers such that the connecting belts are exposed. As such, objects, packages, or other articles, such as the clothing of a user, may get caught or pinched between the rollers and/or connecting belts, getting stuck and possibly disrupting the conveyance of the system. Additionally, users may get fingers, hands, or other body parts caught or pinched between the rollers and/or connecting belts, possibly resulting in injury. Accordingly, there is need for a motorized conveyor system which permits objects or packages to be conveyed along the conveyor system without catching or pinching objects, packages, clothing, or body parts of users.

SUMMARY

The following is a brief summary of subject matter that is described in greater detail herein. This summary is not intended to be limiting as to the scope of the claims.

In one embodiment, a conveyor system for conveying a package includes a plurality of rollers, a bearing disposed in one end of each roller, and a cap disposed in the other end of each roller. The rollers, bearings, and caps are attached between frames on opposite sides of a base and a drive shaft connected to one of the bearings via a drive belt. The conveyor system also includes a cover disposed on an outside portion of each of the frames. The covers and frames are configured to prevent access to the drive belt from lateral sides of the conveyor system. The bearings, drive shaft, and drive belt may be disposed between the frames or the bearings, drive shaft, and drive belt may be disposed within one of the frames and covered by one of the covers.

In another embodiment, a conveyor system for conveying a package includes a base, frames on opposite sides of the base, a plurality of rollers each having an outer circumference, a first end, and a second end, a bearing disposed in the first end of each roller and having a first channel and a second channel, a cap disposed in the second end of each roller, an attachment axle extending through each of the rollers, caps, and bearings configured to attach the rollers, caps, and bearings to each of the frames, a drive shaft, and a cover disposed on an outside portion of each of the frames. The drive shaft is connected to one of the bearings via a first drive belt. The covers and frames are configured to prevent access to the first drive belt from lateral sides of the conveyor system.

In another embodiment, a bearing for use in a conveyor system includes a first end, a second end opposite the first end, a first channel for receiving one of a first connecting belt and a first drive belt, a second channel for receiving one of a second connecting belt and a second drive belt, and an attachment bore extending inwardly from the second end.

In another embodiment, a conveyor system for conveying a package includes a base and frames on opposite sides of the base. The frames each include a proximal portion, a top portion, a bottom portion, a top distal portion, and a bottom distal portion. The conveyor system also includes a plurality of rollers each having an outer circumference, a first end, and a second end, a bearing disposed in the first end of each roller and having a first channel and a second channel, a cap disposed in the second end of each roller, an attachment axle extending through each of the rollers, caps, and bearings and configured to attach the rollers, caps, and bearings to each of the frames, a drive shaft, and a cover disposed on an outside portion of each of the frames. The drive shaft is connected to one of the bearings via a first drive belt. The rollers are disposed between the frames and at least a portion of each of the bearings is disposed within the frame such that the drive belt is disposed within the frame.

The above summary presents a simplified summary to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later. A further understanding of the nature and advantages of the present disclosure are set forth in the following description and claims, particularly when considered in conjunction with the accompanying drawings in which like parts bear like reference numerals.

BRIEF DESCRIPTION OF THE DRAWINGS

To further clarify various aspects of embodiments of the present disclosure, a more particular description of the certain embodiments will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale for all embodiments. Embodiments and other features and advantages of the present disclosure will be described and explained with additional specificity and detail through the use of the accompanying drawings in which:

FIG. 4 illustrates a front, schematic view of a roller and bearing according to one embodiment for use with the conveyor system of FIG. 1;

FIG. 16 illustrates a front, schematic view of a roller and the bearing of FIGS. 12 and 13 for use with the conveyor system of FIG. 9;

DETAILED DESCRIPTION

Figure 1:
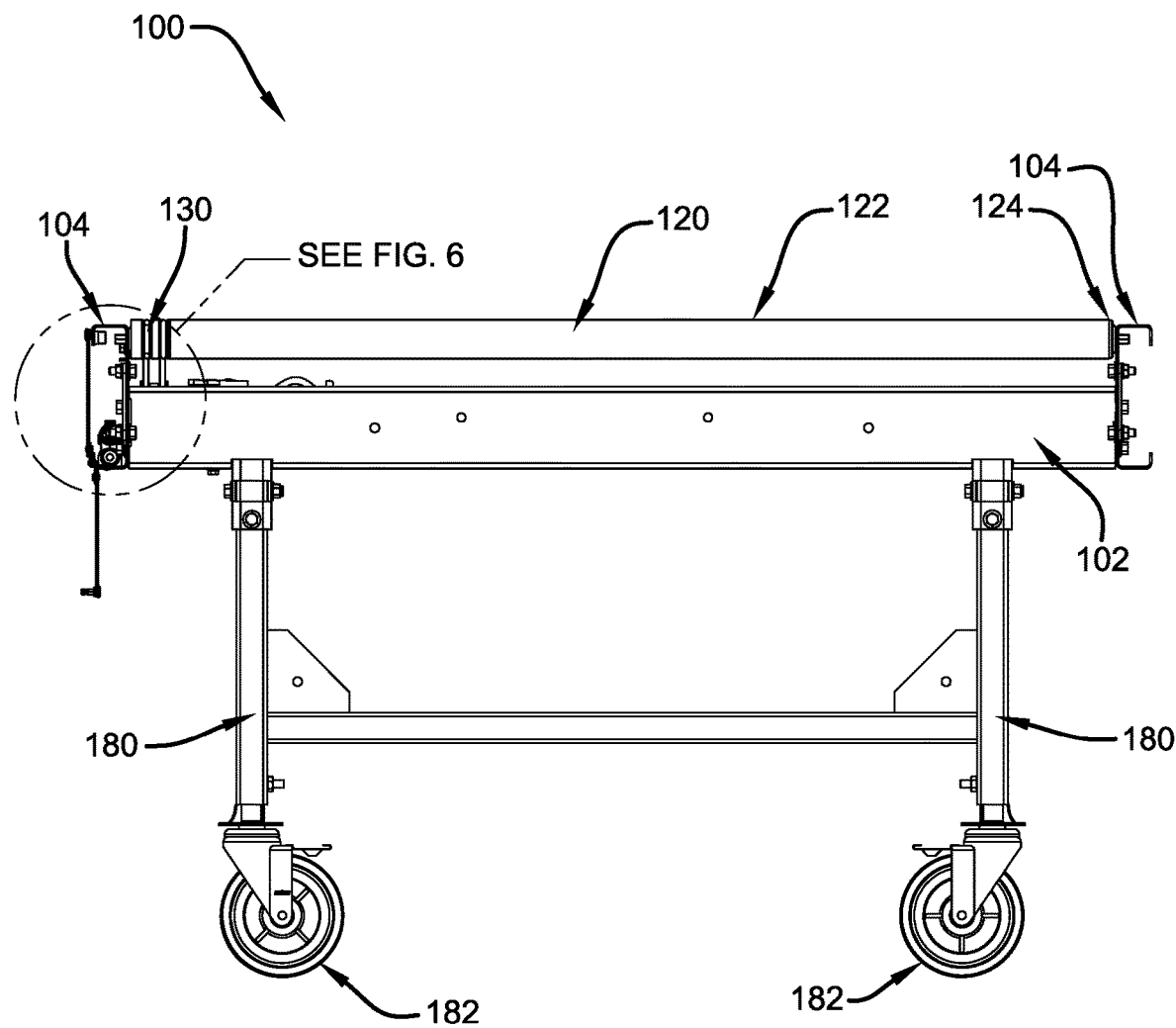
FIG. 1 illustrates a front view of a conveyor system according to one embodiment.
Figure 2:
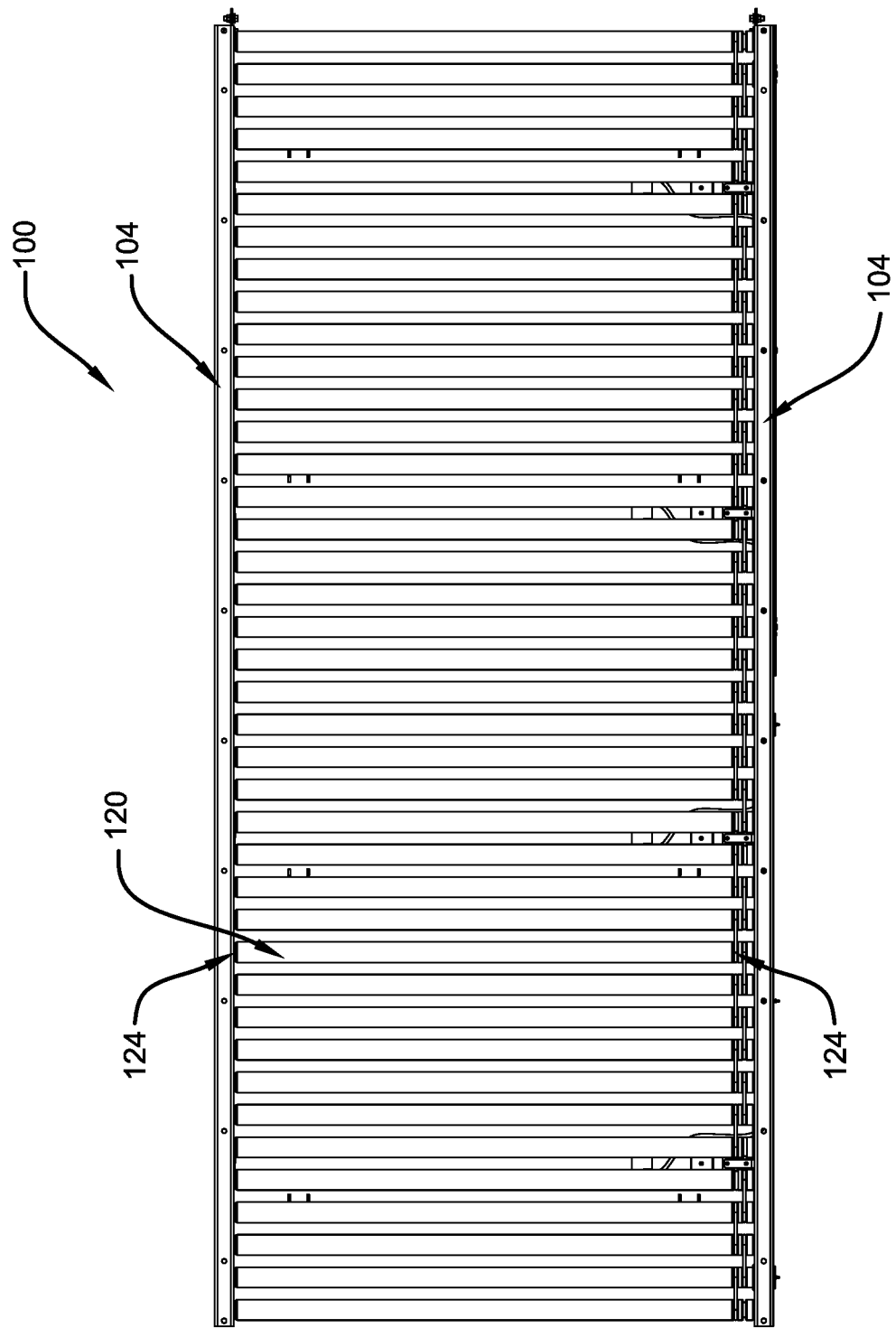
FIG. 2 illustrates a top view of the conveyor system of FIG. 1.

The following description refers to the accompanying drawings, which illustrate specific embodiments of the present disclosure. Other embodiments having different structures and operation do not depart from the scope of the present disclosure.

Described herein are various technologies pertaining to a conveyor system for conveying a package that includes a plurality of rollers, a bearing disposed in one end of each roller, and a cap disposed in the other end of each roller. The rollers, bearings, and caps are attached between frames on opposite sides of a base and a drive shaft connected to one of the bearings via a drive belt. The conveyor system also includes a cover disposed on an outside portion of each of the frames. The covers and frames are configured to prevent access to the drive belt from lateral sides of the conveyor system. The bearings, drive shaft, and drive belt may be disposed between the frames or the bearings, drive shaft, and drive belt may be disposed within one of the frames and covered by one of the covers Referring to FIGS. 1-6, a conveyor system 100 is depicted according to one embodiment. The conveyor system 100 includes a base 102, frames 104 on each side of the base 102, and two or more rollers 120 extending perpendicularly between the frames 104. The rollers 120 are substantially cylindrical with an outer circumference 122 and ends 124 at opposite locations of the roller 120. The rollers 120 may be any suitable size, shape, or composition. In the illustrated embodiment, the rollers 120 are about 1.9 inch diameter galvanized steel tubes. However, the rollers 120 may have any suitable size and shape. For example, the rollers 120 may have a diameter between about 0.5 inches and about 4 inches, such as between about 1 inch and about 3 inches, and may comprise steel, iron, aluminum, PVC, rubber, polyurethane, or other suitable materials. The rollers 120 may be attached to the frames 104, such as described below, and rotated to move an object or package along the conveyor system 100.

The frames 104 are generally rectangular and C-shaped and extend substantially the length of the base 102. The frames 104 have a proximal portion 106 adjacent to and extending vertically along the sides of the base 102, a top portion 108 and a bottom portion 110 extending outwardly from the proximal portion 106, a top distal portion 112 extending downwardly from the top portion 108, and a bottom distal portion 114 extending upwardly from the bottom portion 110. The top distal portion 112 may extend a distance downwardly from the top portion 108 and the bottom distal portion 114 may extend a distance upwardly from the bottom portion 110 such that a frame opening 116 exists between the top and bottom distal portions 112, 114 such that a user may access an outside of the proximal portion 106 through the frame opening 116 between the top distal portion 112 and bottom distal portion 114.

As shown in FIG. 4, each roller 120 may include one or more bearings 130 disposed in one or more ends 124 of the roller 120. The bearings 130 may be configured to attach the rollers 120 to the frame 104 and drive the rotation of the rollers 120, such as detailed below. Each bearing 130 may include a first end 132, a second end 134 opposite the first end 132, a first groove or channel 136 near the second end 134, and second groove or channel 138 nearer the first end 132 from the first channel 136. The first and second channels 136, 138 may be sized, shaped, or otherwise configured to securely retain an O-ring or belt, such as a drive belt or connecting belt, to facilitate rotation of the roller 120. In some embodiments, the first and second channels 136, 138 are smooth and/or rounded. However, the first and second channels 136, 138 may have any suitable size, shape, or configuration such as to facilitate rotation of drive shafts and/or bearings, as described below. For example, the first and second channels 136, 138 may have one or more tongues, grooves, or ribs, such as triangular or V-shaped ribs, rectangular or U-shaped ribs, trapezoidal ribs, or curved or serpentine ribs, extending longitudinally or horizontally along the length of the channel such that the first and second channels 136, 138 may mate with, more securely retain, and/or rotate a ring or belt, as described below.

The first end 132 of the bearing 130 may be disposed in one of the ends 124 of the roller 120. In some embodiments, the first end 132 of the bearing 130 is press fit into one end 124 of the roller 120. However, the bearings 130 may be disposed or secured in the rollers 120 by other means. For example, the bearings 130 may be welded into the end 124 of the roller 120, the bearings 130 may secured in the end 124 of the roller 120 by a fastener or adhesive, the bearings 130 may be snap fit into the end 124 of the roller 120, or the bearings 130 may be integral with the roller 120. The other end 124 of the roller 120 may have a cap 154 disposed in the end 124. The cap 154 may be sized, shaped, and configured to substantially seal the end 124 of the roller 120 and to permit an attachment axle to pass therethrough, as described below. The cap 154 may be disposed in or attached to the end 124 of the roller similarly to the bearing 130.

An attachment axle 146 may extend through the combined roller 120, bearing 130, and cap 154 to attach and support the bearing 130 and roller 120 between the frames 104. The attachment axle 146 may be longer than the combined bearing 130, cap 154, and roller 120 and extend through the length of the bearing 130 from the second end 134 through the first end 132, through the length of the cap 154, and through the length of the roller 120 between the ends 124 such that the attachment axle 146 is exposed on both sides of the bearing 130, cap 154, and roller 120 combination. The attachment axle 146, bearing 130, and roller 120 may be attached such that the bearing 130 and roller 120 may rotate about the attachment axle 146 without the attachment axle 146 rotating. The attachment axle 146 may be sized and shaped to correspond with a receiving aperture in the frame 104, as described below regarding FIGS. 19 and 20. In the illustrated embodiment, the attachment axle 146 is hexagonal and comprises steel. However, it will be appreciated that the attachment axle 146 may have any size, shape, configuration, or composition. For example, the attachment axle 146 may be circular, oval, triangular, rectangular, or pentagonal. In some embodiments, the attachment axle 146 is spring loaded to facilitate attachment of the bearing 130, roller 120, and attachment axle 146 to the frame 104, as described below regarding FIGS. 19 and 20.

The bearings 130 may be disposed in the frame 104 such that the roller 120 may rotate freely within the frames 104. The attachment axle 146 extending through each combined bearing 130, cap 154, and roller 120 may be disposed through a bearing securement aperture 119 (not pictured, but see bearing securement apertures 219 in FIG. 19) in an upper portion of the proximal portion 106 of the frame 104. Each frame 104 may include a plurality of bearing securement apertures 119 corresponding to the desired number of rollers 120 to be used in each conveyor system 100. The bearing securement apertures 119 may be sized and shaped to receive the attachment axle 146 extending through the bearing 130 and roller 120 and such that the bearing 130 and roller 120 may rotate freely when the attachment axle 146 is received through and secured in the bearing securement aperture 119. In some embodiments, the attachment axles 146 are spring loaded such that force may be applied to the attachment axles 146 to compress the attachment axles 146 and, when the attachment axles 146, bearings 130, and rollers 120 are in position, the force may be removed, allowing the attachment axles 146 to extend through the bearing securement apertures 119. In some embodiments, the attachment axle 146 is secured on the distal side of the proximal portion 106 of the frame 104 by a securement means, such as a bolt, nut, or other fastener. The attachment axles 146 and rollers 120 may be similarly attached to the other frame 104 on the opposite side of the conveyor system 100. In such a position, the rollers 120 may be secured within the frame 104 such that the bearings 130 and rollers 120 may rotate freely.

Figure 5:
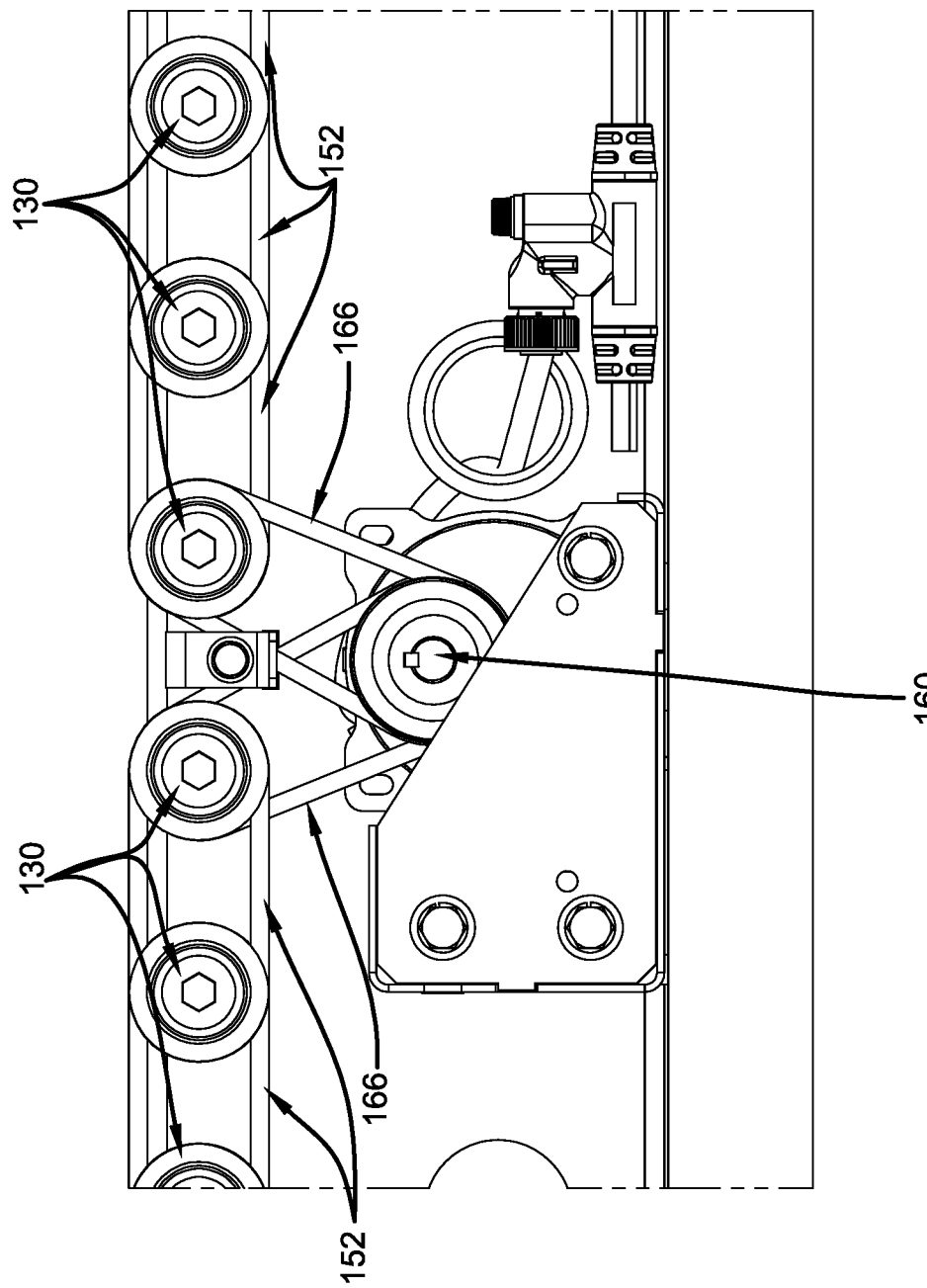
FIG. 5 illustrates a cut-away sectional view of area B shown in FIG. 3.
Figure 6:
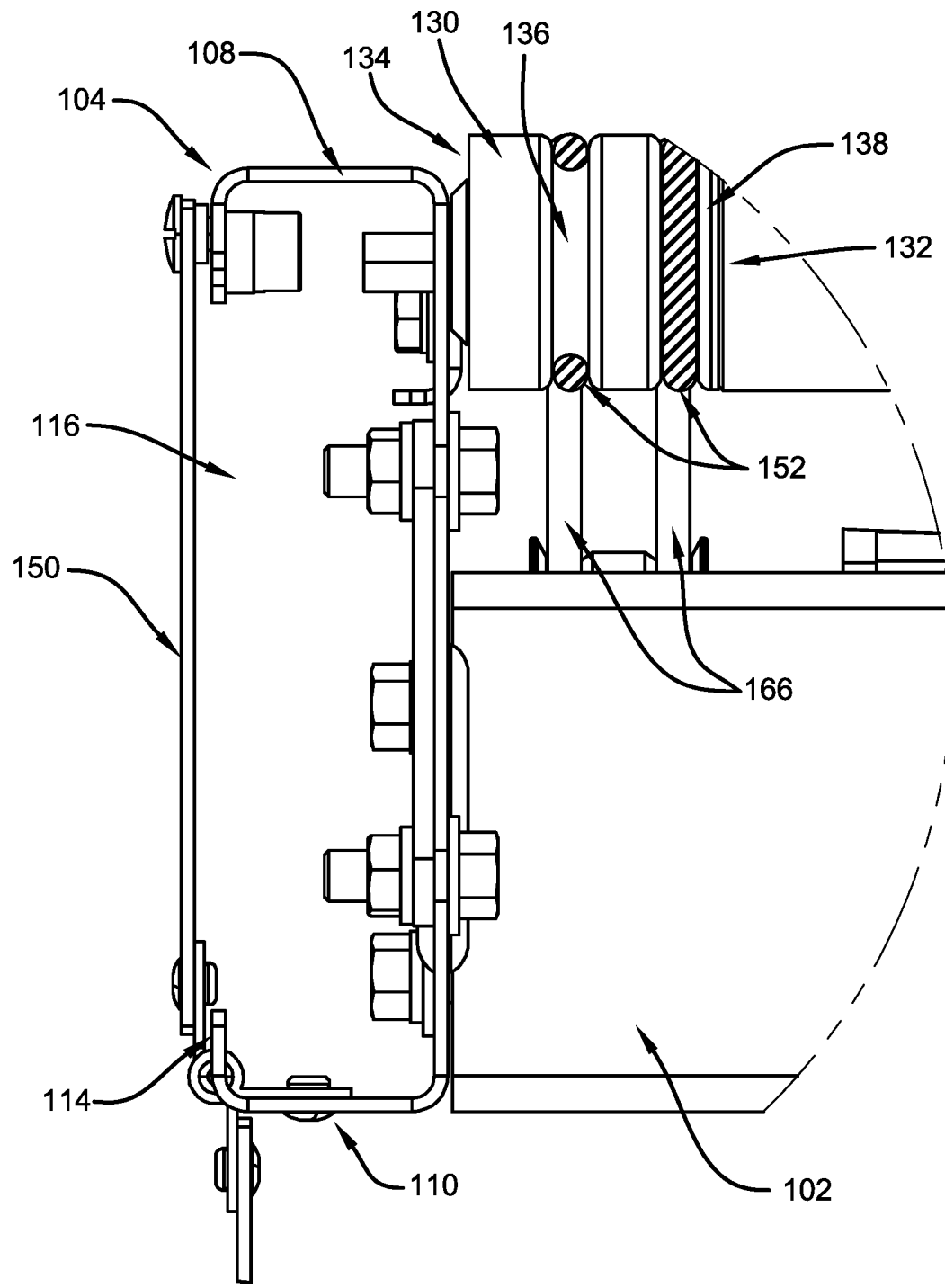
FIG. 6 illustrates a cut-away sectional view of area A shown in FIG. 1.

As shown in FIGS. 5 and 6, the conveyor system 100 may also include one or more drive shafts 160 configured to rotate one or more rollers 120 via one or more drive belts 166. The drive belts 166 may have any suitable size, shape, configuration, and composition. The drive belts 166 may comprise urethane, polyurethane, polytetrafluoroethylene, nitrile, neoprene, rubber, silicone, or any other suitable material. The drive belts 166 may have a diameter between about ⅛ inch and about 1 inch. In some embodiments, the drive belts 166 may be ¼ inch diameter and may comprise urethane. In some embodiments, an inside surface of the drive belts 166 is smooth and/or rounded. In other embodiments, the drive belts 166 may be rings or belts with one or more tongues, grooves, or ribs, such as triangular or V-shaped ribs, rectangular or U-shaped ribs, trapezoidal ribs, or rounded or serpentine ribs, extending longitudinally or horizontally along the inside surface of the belt such that the drive belts 166 may mate with, be more securely dispose within, and/or rotate or be rotated by the first or second channels 136, 138 and/or drive grooves or channels, as described below.

In some embodiments, the drive shafts 160 may be disposed substantially beneath at least one of the bearings 130. In other embodiments, the drive shafts 160 may be beneath and laterally offset from one or more rollers 120 and/or bearings 130 to which the drive shaft 160 is connected. Each drive shaft 160 may be connected to a motor which causes the drive shaft 160 to rotate and may include a first drive groove or channel 162 and a second drive groove channel 164 (not pictured, but see 264 in FIG. 20). The motor may be disposed on the distal side of the frame 104 and connected to the drive shaft 160 through an aperture in the proximal portion 106 of the frame 104. The first and second drive channels 162, 164 may be sized, shaped, or otherwise configured to securely retain at least a portion of one of the drive belts 166 and cause the drive belt 166 to rotate in accordance with the drive shaft 160. For example, the first and second drive channels 162, 164 may be smooth and rounded or may have one or more tongues, grooves, or ribs, such as triangular or V-shaped ribs, rectangular or U-shaped ribs, trapezoidal ribs, or curved or serpentine ribs, extending longitudinally or horizontally along the length of the channel such that the first and second drive channels 162, 164 mate with, more securely retain, and/or rotate one of the drive belts 166, such as by interlacing or interlocking with ribs or grooves on the inner surface of one of the drive belts 166.

The conveyor system 100 may include a number of drive shafts 160 corresponding to the number of roller sections in the conveyor system 100. In one embodiment, the conveyor system 100 includes four drive shafts 160 corresponding to four roller sections each having fourteen rollers 120. However, it will be appreciated that the conveyor system 100 may have any number of rollers 120, roller sections, drive shafts 160, and/or number of rollers 120 in a roller section. In some embodiments, the drive shafts 160 are located on one side of the conveyor system 100 (e.g., near one end 124 of each roller 120). In other embodiments, drive shafts 160 are located on both sides of the conveyor system 100 (e.g., near both ends 124 of each roller 120).

The conveyor system 100 may include one drive belt 166 disposed in and around the first drive channel 162 of each drive shaft 160 and another drive belt 166 disposed in and around the second drive channel 164 of each drive shaft 160.

The drive belt 166 disposed in and around the first drive channel 162 of the drive shaft 160 may also be disposed in and around either the first or second channel 136, 138 of one of the bearings 130 disposed in one of the rollers 120, such as one of the rollers 120 substantially in the middle of one of the roller sections. The drive belt 166 disposed in and around the second drive channel 164 of the drive shaft 160 may also be disposed in and around either the first or second channel 136, 138 of one of the bearings 130 disposed in one of the rollers 120 next to the roller 120 connected to the drive belt 166 connected to the first drive channel 162 of the drive shaft 160. In such a manner, the drive belts 166 may translate the rotational movement of the drive shaft 160 into rotational movement of the connected rollers 120. In some embodiments, grooves or ribs on the inside surface of each of the drive belts 166 may interlock or interlace with grooves or ribs in the first or second drive channel 162, 164 and grooves or ribs in the first or second channel 136, 138 of one of the bearings 130 such that rotational movement of the drive shaft 160 is translated into rotational movement of the bearing 130 via the drive belt 166. While the drive shafts 160 have been described as being connected to two rollers 120, it will be appreciated that the drive shafts 160 may be similarly connected to any number of rollers 120. For example, each of the drive shafts 160 may be connected to one or three or more rollers 120.

The other rollers 120 in the roller section may be connected to the rollers 120 connected to the drive shaft 160, such as in series, to translate the rotational movement of the drive shaft 160 to the other rollers 120 in the roller section. Each of the rollers 120 connected to the drive shaft 160 may also be connected to the adjacent roller 120 that is not connected to the drive shaft 160 by a connecting belt 152. The connecting belts 152 may have any suitable size, shape, and composition. The connecting belts 152 may comprise urethane, polyurethane, polytetrafluoroethylene, nitrile, neoprene, rubber, silicone, or any other suitable material. The connecting belts 152 may have a diameter between about ⅛ inch and about 1 inch. In some embodiments, the connecting belts 152 may be ¼ inch diameter and may comprise urethane. In some embodiments, an inside surface of the connecting belts 152 are smooth and/or rounded. In other embodiments, the connecting belts 152 may be rings or belts with one or more tongues, grooves, or ribs, such as triangular or V-shaped ribs, rectangular or U-shaped ribs, trapezoidal ribs, or rounded or serpentine ribs, extending longitudinally or horizontally along the inside surface of the belt such that the connecting belt 152 may mate with, be more securely retained within, and/or rotate or be rotated by the first or second channels 136, 138. For the rollers 120 connected to the drive shaft 160, the connecting belts 152 may be disposed in and around the first or second channel 136, 138 of the bearing 130 attached to the roller 120 that does not contain the drive belt 166. The connecting belt 152 may then be stretched to be in and around the corresponding first or second channel 136, 138 of the bearing 130 connected to the adjacent roller 120 that is not connected to the drive shaft 160. In some embodiments, grooves or ribs on the inside surface of the connecting belts 152 may interlock or interlace with grooves or ribs in the first and/or second channels 136, 138 of one of the bearings 130 such that rotational movement of one of the bearings 130 is translated into rotational movement of the other connected bearing 130 via one or more connecting belts 152. Connecting belts 152 may similarly connect the adjacent bearings 130 of all the rollers 120 in a chain, such that all rollers 120 in the roller section are connected either by the drive belts 166 or the connecting belts 152. As such, the rotational movement of the drive shaft 160 may translate to rotational movement of all the rollers 120 in the roller section.

The bearings 130, drive shafts 160, drive belts 166, and connecting belts 152 may be disposed between the frames 104 of the conveyor system 100, such as via the attachment axle 146. The drive shaft 160 is disposed within the base 102 and the drive belts 166 extend downwardly from the rollers 120 and into the base 102. The connecting belts 152 extend substantially horizontally between the bearings 130 attached to the rollers 120. As such, the drive belts 166 and the connecting belts 152 are protected from the sides of the conveyor system 100 by the frame 100.

The frame 104 may also include a cover 150 which may be attached to and substantially cover the frame opening 116 and protect the side of the conveyor system 100. The cover 150 may extend a distance between the top distal portion 112 and the bottom distal portion 114 of the frame 104, substantially covering the frame opening 116. The cover 150 may be disposed on or be otherwise affixed or attached to the top and bottom distal portions 112, 114 of the frame 104. For example, the top and bottom distal portions 112, 114 may have a plurality of attachment apertures extending along a length of the top and bottom distal portions 112, 114, respectively, and the cover 150 may also have a plurality of attachment apertures extending along the length of the cover 150 and corresponding to the attachment apertures in the top and bottom distal portions 112, 114. A fastener, such as a screw or bolt, may be fastened through the attachment apertures of the top distal portion 112 and the cover 150 and another fastener may be fastened through the attachment apertures of the bottom distal portion 114 and the cover 150 and secured in the apertures by a securement means, such as by a nut, washer, or bolt. In the illustrated embodiment, the fastener is inserted through the cover 150 and then the top or bottom distal portion 112, 114 and the nut is secured on the fastener in the space between the top and bottom distal portions 112, 114 and the proximal portion 106 of the frame 104. While the cover 150 is described as being attached to the top and bottom distal portions 112, 114 via fasteners, it will be appreciated that the cover 150 may be disposed on or otherwise affixed to the top and bottom distal portions 112, 114 by other means. For example, the cover 150 may be attached to the top and bottom distal portions 112, 114 by magnets, welding, or adhesives. When attached, the cover 150 may prevent objects, such as articles of clothing, or body parts of users, such as hands or fingers, from getting caught or pinched between the rollers 120, bearings 130, connecting belts 152, and/or drive belts 166.

Figure 3:
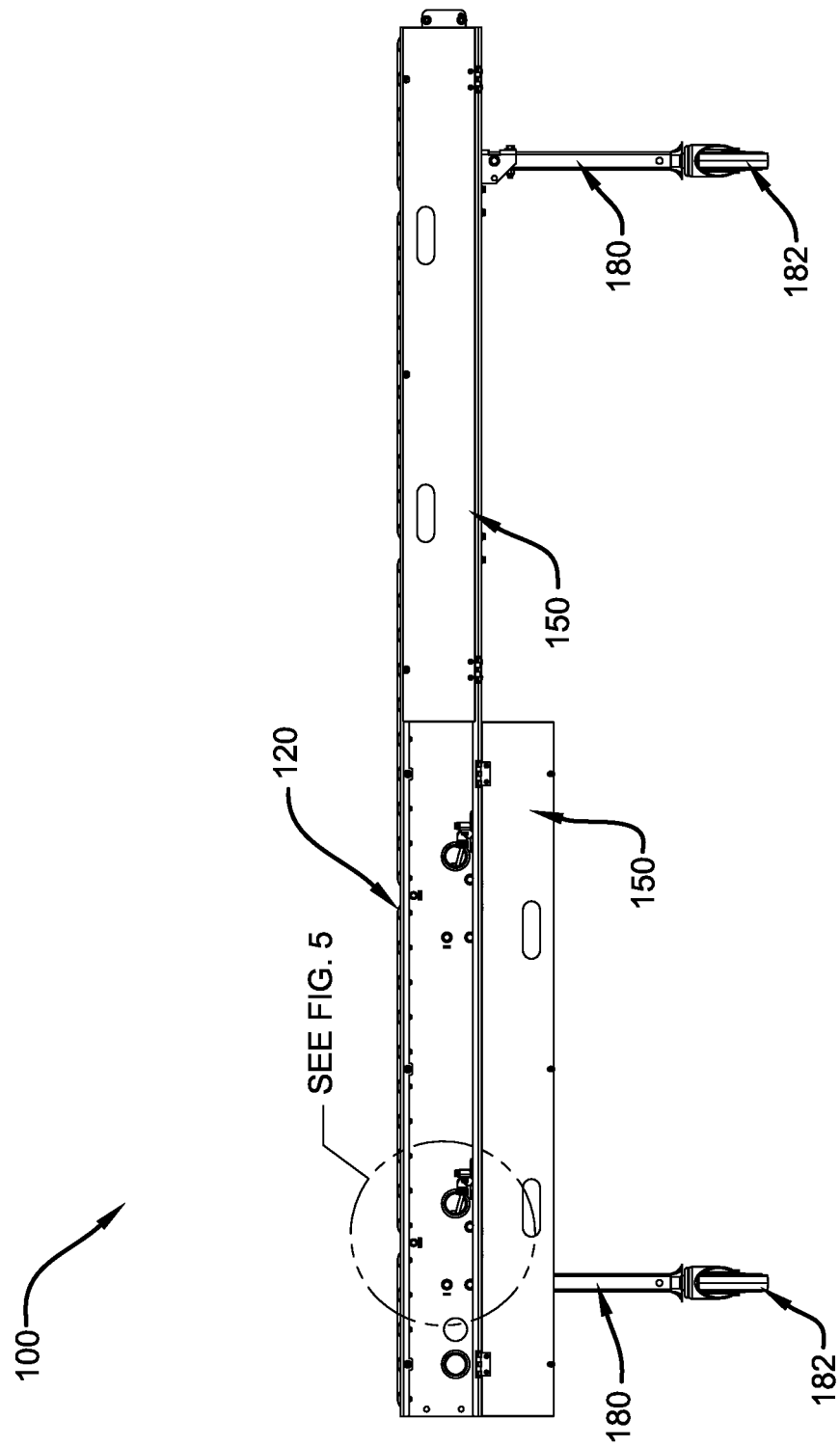
FIG. 3 illustrates a side view of the conveyor system of FIG. 1.

In some embodiments, such as shown in FIG. 3, the cover 150 may be detachable or pivotably connected to the frame 104. In such embodiments, at least a portion of the cover 150 may be disconnected so that the cover 150 may be removed or pivoted away from the frame 104 such that the frame opening 116 is exposed.

In some embodiments, such as shown in FIGS. 1 and 3, the conveyor system 100 also includes legs or supports 180 disposed on the underside of the base 102 to support the conveyor system 100 on a ground or floor. The legs or supports 180 may be sized such that a user may easily place an object or package on top of the rollers 120, such as when the user is in a standing position. The legs or supports 180 may be detachable and/or collapsible such that the conveyor system 100 may be moved or stored more easily. The legs or supports 180 may also include wheels 182 at the bottom of the legs or supports 180 such that the conveyor system 100 may be moved or otherwise positioned, such as by sliding the conveyor system 100 on the floor or ground.

Figure 7:
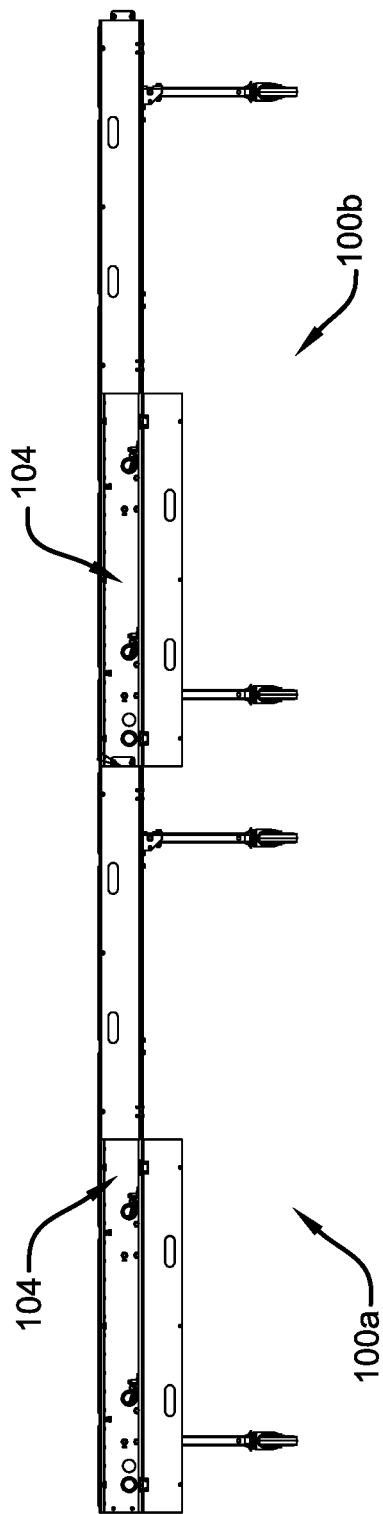
FIG. 7 illustrates a side view of two conveyor systems of FIG. 1 connected together.
Figure 8:
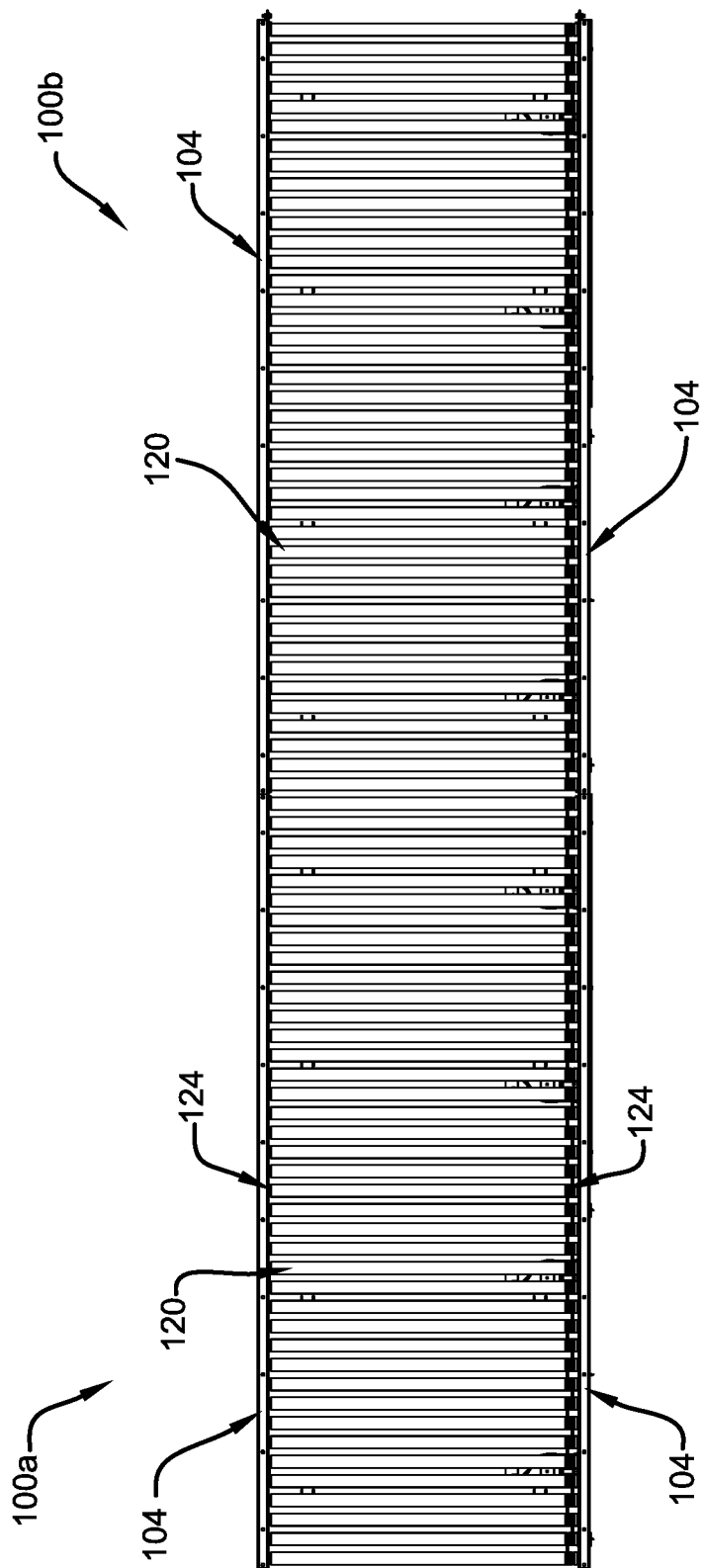
FIG. 8 illustrates a top view of two conveyor systems of FIG. 1 connected together.

As shown in FIGS. 7 and 8, two conveyor systems 100, such as a first conveyor system 100a and a second conveyor system 100b may be affixed or otherwise attached together, such that an object or package may move along the rollers 120 of the first conveyor system 100a and then along the rollers 120 of the second conveyor system 100b. In some embodiments, the frames 104 and/or base 102 of the first conveyor system 100a are attached to the frames 104 and/or base 102 of the second conveyor system 100b via fasteners, such as screws, nuts, and bolts. However, it will be appreciated that the first conveyor system 100a may be attached to the second conveyor system 100b via other suitable means, such as welding, magnets, or adhesives.

Referring to FIGS. 9-20, a conveyor system 200 is depicted according to a second embodiment. The conveyor system 200 includes a base 202, frames 204 on each side of the base 202, and two or more rollers 220 extending perpendicularly between the frames 204. The rollers 220 are substantially cylindrical with an outer circumference 222 and ends 224 at opposite locations of the roller 220. The rollers 220 may be any suitable size, shape, or composition. In the illustrated embodiment, the rollers 220 are 1.9 inch diameter galvanized steel tubes. However, the rollers 220 may have any suitable size and shape. For example, the rollers 220 may have a diameter between about 0.5 inches and about 4 inches, such as between about 1 inch and about 3 inches, and may comprise steel, iron, aluminum, PVC, rubber, polyurethane, or other suitable materials. The rollers 220 may be attached to the frame 204, such as described below, and rotated to move an object or package along the conveyor system 200.

The frames 204 are generally rectangular and C-shaped and extend substantially the length of the base 202. The frames 204 have a proximal portion 206 adjacent to and extending vertically along the sides of the base 202, a top portion 208 and a bottom portion 210 extending outwardly from the proximal portion 206, a top distal portion 212 extending downwardly from the top portion 208, and a bottom distal portion 214 extending upwardly from the bottom portion 210. The top distal portion 212 may extend a distance downwardly from the top portion 208 and the bottom distal portion 214 may extend a distance upwardly from the bottom portion 210 such that a frame opening 216 exists between the top and bottom distal portions 212, 214 such that a user may access an outside of the proximal portion 206 through the frame opening 216 between the top distal portion 212 and the bottom distal portion 214.

As shown in FIGS. 12-16, each roller 220 may include one or more bearings 230 disposed in one or more ends 224 of the roller 220. The bearings 230 may be configured to attach the rollers 220 to the frame 204 and drive rotations of the rollers 220, such as detailed below. Each bearing 230 may include a first end 232, a second end 234 opposite the first end 232, a first groove or channel 236 near the second end 234, and a second groove or channel 238 nearer the first end 232 from the first channel 236. The first and second channels 236, 238 may be sized, shaped, or otherwise configured to securely retain an O-ring or belt, such as a drive belt or connecting belt, to facilitate rotation of the roller 220. In some embodiments, the first and second channels 236, 238 are smooth and/or rounded. However, the first and second channels 236, 238 may have any suitable size, shape, or configuration. For example, the first and second channels 236, 238 may have one or more tongues, grooves, or ribs, such as triangular or V-shaped ribs, rectangular or U-shaped ribs, trapezoidal ribs, or curved or serpentine ribs, extending longitudinally or horizontally along the length of the channel such that the first and second channels 236, 238 may mate with, more securely retain, and/or rotate a ring or belt, as described below.

The first end 232 of the bearing 230 may be disposed in one of the ends 224 of one of the rollers 220. In some embodiments, the first end 232 of the bearing 230 is press fit into the end 224 of the roller 220. However, the bearings 230 may be disposed or secured in the rollers 220 by other means. For example, the bearing 230 may be welded into the end 224 of the roller 220, the bearing 230 may be secured in the end of the roller 220 by a fastener or adhesive, the bearing 230 may be snap fit into the end 224 of the roller 220, or the roller 220 may be integral with the bearing 230. The other end 224 of the roller 220 may have a cap 254 disposed in the end 224. The cap 254 may be size, shaped, and configured to substantially seal the end 224 of the roller 220 and to permit an attachment axle to pass therethrough, as described below. The cap 254 may be disposed in or attached to the end 224 of the roller similarly to the bearing 130.

The bearing 230 may also have a third groove or channel 244 disposed between the second channel 238 and the first end 232. The third channel 244 may allow the bearing 230 and attached roller 220 to be situated within the frame 204 and toward the top portion 208 of the frame 204, as described below. In some embodiments, the third channel 244 is smooth and flat. However, the third channel 244 may have any suitable size, shape, or configuration. For example, the third channel 244 may have one or more tongues, grooves, or ribs, such as triangular or V-shaped ribs, rectangular or U-shaped ribs, trapezoidal ribs, or curved or serpentine ribs, extending longitudinally or horizontally along the length of the channel.

Each bearing 230 may also include an attachment bore 242 extending into the second end 234. The attachment bore 242 may be used to securely attach the bearing 230, cap 254, and roller 220 to and between the frames 204. In the illustrated embodiment, the attachment bore 242 is a hexagonal bore. However, it will be appreciated that the attachment bore 242 may have any suitable shape, such as described below. For example, the attachment bore 242 may be circular, oval, triangular, rectangular, or pentagonal. In some embodiments, the attachment bore 242 may extend through the length of the bearing 230 from the first end 232 to the second end 234. However, in other embodiments, the attachment bore 242 does not extend through the length of the bearing 230 and is inset a specified distance from the second end 234.

Figure 19:
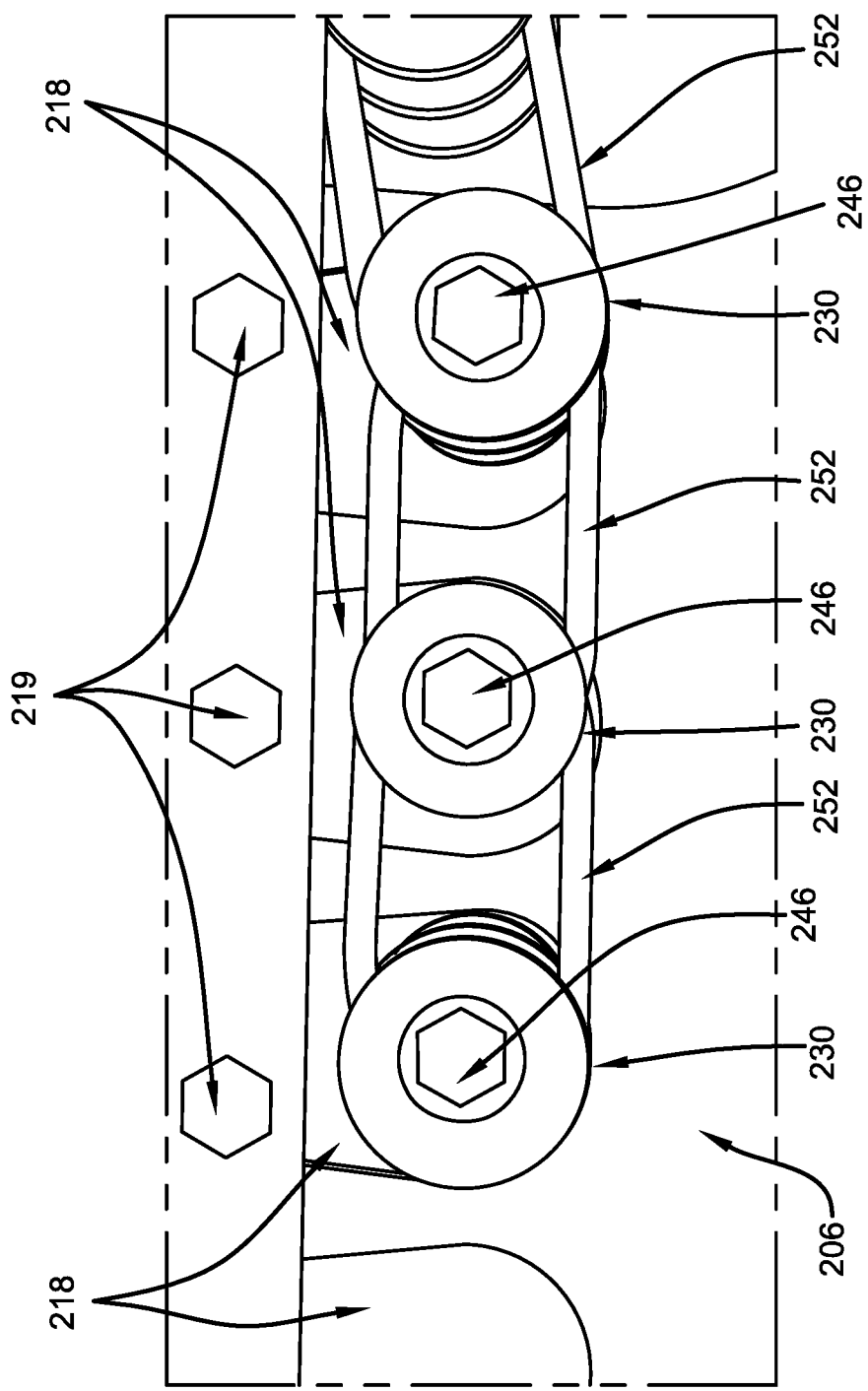
FIG. 19 illustrates a side view of the frame, bearing, and belts of the conveyor system of FIG. 9 in the installation position.

As shown in FIGS. 16 and 19, the attachment bore 242 of the bearing 230 may be sized and shaped to receive an attachment axle 246 which may attach and support the bearing 230 and roller 220 between the frames 204. The attachment axle 246 may be longer than the combined bearing 230, cap 254, and roller 220 and extend through the length of the bearing 230 from the second end 234 through the first end 232, through the cap 254, and through the length of the roller 220 between the ends 224 such that the attachment axle 246 is exposed on both sides of the bearing 230, cap 254, and roller 220 combination. The attachment axle 246, bearing 230, cap 254, and roller 220 may be attached such that the bearing 230 and roller 220 may rotate about the attachment axle 246 without the attachment axle 246 rotating. The attachment axle 246 may be sized and shaped to correspond with the size and shape of the attachment bore 242 of the bearing 230. In the illustrated embodiment, the attachment axle 246 is hexagonal and comprises steel. However, it will be appreciated that the attachment axle 246 may have any size, shape, configuration, or composition. For example, the attachment axle 246 may be circular, oval, triangular, rectangular, or pentagonal and may comprise steel, iron, aluminum, carbon fiber, or other suitable materials. In some embodiments, the attachment axle 246 is spring loaded to facilitate attachment of the bearing 230, roller 220, and attachment axle 246 to the frame 204, as described below. In embodiments where the attachment bore 242 does not extend through the bearing 230, the conveyor system 200 may include a first attachment axle 246 which extends through one end of the roller 220 and to the first end 232 of the bearing 230 and a second attachment axle 246 which fits into and extends out of the attachment bore 242.

Figure 20:
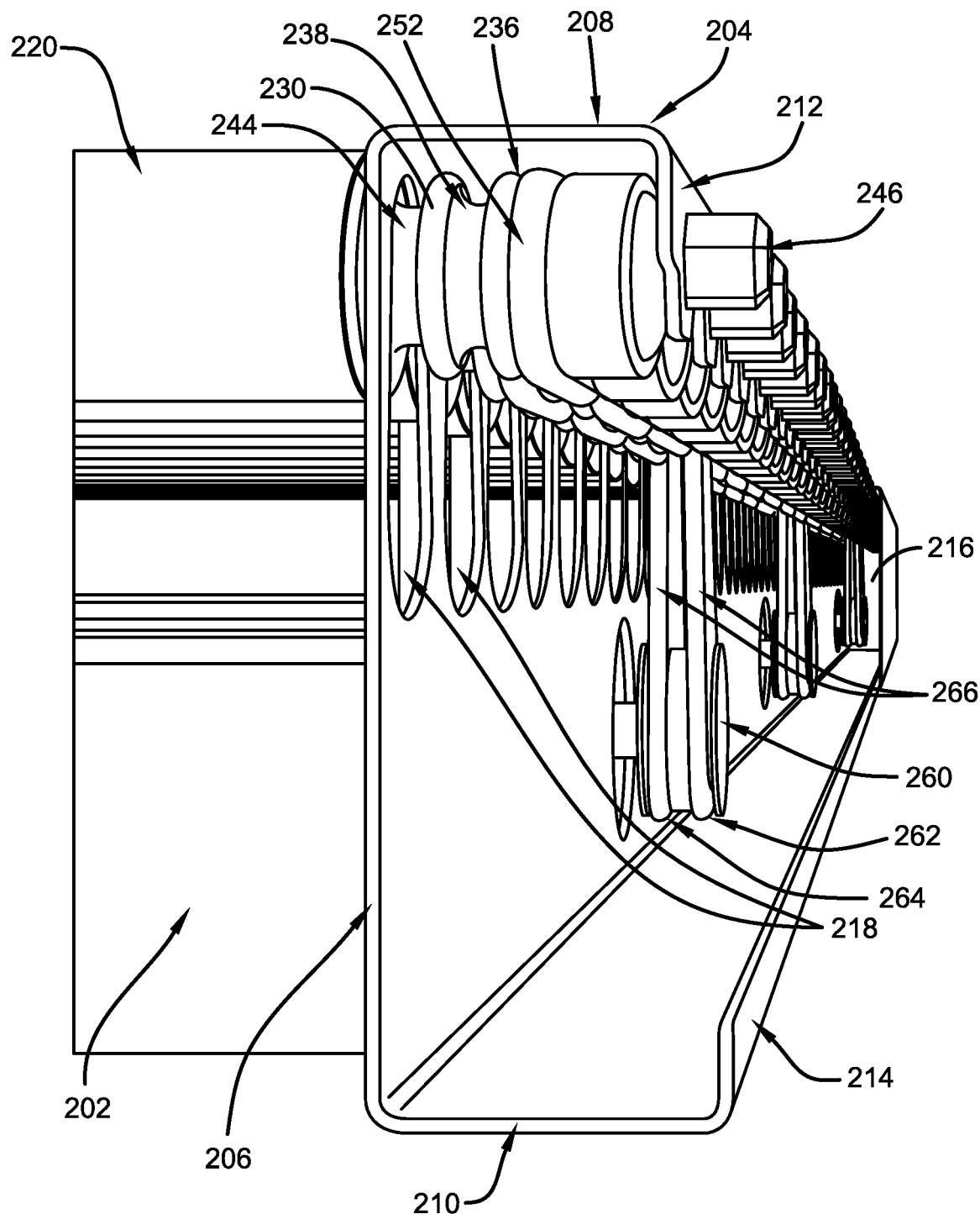
FIG. 20 illustrates a perspective view of the rollers, bearings, belts, and drive shaft of the conveyor system of FIG. 9.

The bearings 230 may be disposed in the frame 204 such that the roller 220 may rotate freely within the frames 204. As shown in FIGS. 19 and 20, the frame 204 may include a plurality of bearing receiving apertures 218 disposed in the proximal portion 206. The bearing receiving apertures 218 may be sized, shaped, and configured to receive at least a portion of one of the bearings 230 therethrough. The bearing receiving apertures 218 may be sized, shaped, and configured such that a user may connect the bearings 230 with connecting belts, as described below, when the bearings 230 are in a lower position in the bearing receiving apertures 218 and such that the bearings 230, rollers 220, and attachment axle 246 may be retained in the top distal portion 212 in an upper position, as described below. In the illustrated embodiment, the bearing receiving apertures 218 are oval. However, it will be appreciated that the bearing receiving apertures 218 may be any shape. For example, the bearing receiving apertures 218 may be circular, elliptical, triangular, or rectangular.

The frame 204 may also include a plurality of bearing securement apertures 219 disposed in the top distal portions 212. The bearing securement apertures 219 may be sized, shaped, and configured to receive the attachment axle 246 and thereby secure the bearings 230 and rollers 220 in an upper portion of the frame 204. In the illustrated embodiment, the bearing securement apertures 219 are hexagonal. However, it will be appreciated that the bearing securement apertures 219 may be any size, shape, or configuration. For example, the bearing securement apertures 219 may be circular, oval, triangular, rectangular, or pentagonal.

As shown in FIGS. 17-20, the conveyor system 200 may also include one or more drive shafts 260 configured to rotate one or more rollers 220 via one or more drive belts 266. The drive belts 266 may have any suitable size, shape, or composition. In some embodiments, the drive belts 266 may comprise urethane, polyurethane, polytetrafluoroethylene, nitrile, neoprene, rubber, silicone, or any other suitable material. The drive belts 266 may have a diameter between about ⅛ inch and about 1 inch. In some embodiments, the drive belts 266 may be ¼ inch in diameter and may comprise urethane. In some embodiments, an inside surface of the drive belts 266 is smooth and/or rounded. In other embodiments, the drive belts 266 may be rings or belts with one or more tongues, grooves, or ribs, such as triangular or V-shaped ribs, rectangular or U-shaped ribs, trapezoidal ribs, or rounded or serpentine ribs, extending longitudinally or horizontally along the inside surface of the belt such that the drive belts 266 may mate with, be more securely retained within, and/or rotate or be rotated by the first and second channels 236, 238 and/or the channels of one of the drive shafts 260, as described below.

In some embodiments, the drive shafts 260 may be disposed substantially beneath at least one of the bearings 230. In other embodiments, the drive shafts 260 may be beneath and laterally offset from one or more rollers 220 and/or bearings 230 to which the drive shaft 260 is connected. Each drive shaft 260 may be connected to a motor which causes the drive shaft 260 to rotate and may include a first drive channel 262 and a second drive channel 264. The first and second drive channels 262, 264 may be sized, shaped, or otherwise configured to securely retain at least a portion of one of the drive belts 266 and cause the drive belt 266 to rotate in accordance with the drive shaft 260. For example, the first and second drive channels 262, 264 may be smooth and rounded or may have one or more tongues, grooves, or ribs, such as triangular or V-shaped ribs, rectangular or U-shaped ribs, trapezoidal ribs, or curved or serpentine ribs, extending longitudinally or horizontally along the length of the channel such that the first and second drive channels 262, 264 may mate with, more securely retain, and/or rotate one of the drive belts 266, such as by interlacing or interlocking with ribs or grooves on the inner surface of one of the drive belts 266.

The conveyor system 200 may include a number of drive shafts 260 corresponding to the number of roller sections in the conveyor system 200. In one embodiment, the conveyor system 200 includes four drive shafts 260 corresponding to four roller sections each having fourteen rollers 220. However, it will be appreciated that the conveyor system 200 may have any number of rollers 220, roller sections, drive shafts 260, and/or number of rollers 220 in a roller section. In some embodiments, the drive shafts 260 are located on one side of the conveyor system 200 (e.g., near one end 224 of each roller 220). In other embodiments, drive shafts 260 are located on both sides of the convey system 200 (e.g., near both ends 224 of each roller 220).

The drive shaft 260 may extend into through the proximal portion 206 of the frame 204 such that the drive shaft is substantially disposed within the frame 204. The drive shaft 260 may be disposed substantially between the top portion 208 and bottom portion 210 of the frame 204 and substantially between the top and bottom distal portions 212, 214 and the proximal portion 206 of the frame 204. The drive shaft 260 may be accessible by a user, such as to attach one or more drive belts 266 to the drive shaft 260, through the frame opening 216.

The conveyor system 200 may include one drive belt 266 disposed in and around the first drive channel 262 of each drive shaft 260 and another drive belt 266 disposed in and around the second drive channel 264 of each drive shaft 260. The drive belt 266 disposed in and around the first drive channel 262 of the drive shaft 260 may also be disposed in and around either the first or second channel 236, 238 of one of the bearings 230 disposed in one of the rollers 220, such as one of the rollers 220 substantially in the middle of the roller sections. The drive belt 266 disposed in and around the second drive channel 264 of the drive shaft 260 may also be disposed in and around either the first or second channel 236, 238 of one of the bearings 230 disposed in one of the rollers 220 next to the roller 220 connected to the drive belt 266 connected to the first drive channel 262 of the drive shaft 260. In such a manner, the drive belts 266 may translate the rotational movement of the drive shaft 260 into rotational movement of the connected rollers 220. In some embodiments, grooves or ribs on the inside surface of each drive belts 266 may interlock or interface with grooves or ribs in the first or second drive channel 262, 264 and grooves or ribs in the first or second channel 236, 238 of one of the bearings 230 such that rotational movement of the drive shaft 260 is translated into rotational movement of the bearing 230 via the drive belt 266. While the drive shafts 260 have been described as being connected to two rollers 220, it will be appreciated that the drive shafts 260 may be similarly connected to any number of rollers 220. For example, each of the drive shafts 260 may be connected to one or three or more rollers 220.

The other rollers 220 in the roller section may be connected to the rollers 220 connected to the drive shaft 260, such as in series, to translate the rotational movement of the drive shaft 260 to the other rollers 220 in the roller section. Each of the rollers 220 connected to the drive shaft 260 may also be connected to the adjacent roller 220 that is not connected to the drive shaft 260 by a connecting belt 252. The connecting belts 252 may be any suitable size, shape, configuration, or composition. The connecting belts 252 may comprise urethane, polyurethane, polytetrafluoroethylene, nitrile, neoprene, rubber, silicone, or any other suitable material. The connecting belts 152 may have a diameter between about ⅛ inch and about 1 inch. In some embodiments, the connecting belts 252 may be a ¼ inch diameter and may comprise urethane. In some embodiments, an inside surface of each connecting belt 252 is smooth and/or rounded. In other embodiments, the connecting belts 252 may be rings or belts with one or more tongues, grooves, or ribs, such as triangular or V-shaped ribs, rectangular or U-shaped ribs, trapezoidal ribs, or rounded or serpentine ribs, extending longitudinally or horizontally along the inside surface of the belt such that the connecting belt 252 may mate with, be more securely retained with, and/or rotate or be rotated by the first or second channels 236, 238. For the rollers 220 connected to the drive shaft 260, the connecting belts 252 may be disposed in and around the first or second channel 236, 238 of the bearing 230 attached to the roller 220 that does not contain the drive belt 266. The connecting belts 252 may then be stretched to be in and around the corresponding first or second channel 236, 238 of the bearing 230 connected to the adjacent roller 220 that is not connected to the drive shaft 260. In some embodiments, grooves or ribs on the inside surface of each of the connecting belts 252 may interlock or interlace with grooves or ribs in the first and/or second channels 236, 238 of one of the bearings 230 such that rotational movement of the one of the bearings 230 is translated into rotational movement of the other connected bearings 230 via one or more connecting belts 252. Connecting belts 252 may similarly connect the adjacent bearings 230 of all the rollers 220 in a chain, such that all rollers 220 in the roller section are connected either by the drive belts 266 or the connecting belts 252. As such, the rotational movement of the drive shaft 260 may translate to rotational movement of all the rollers 220 in the roller section.

The bearings 230 may be connected via connecting belts 252 and drive belts 266, as described above, after the bearings 230 attached to the rollers 220 have been inserted through the bearing receiving apertures 218 in the proximal portion 206 of the frame 204 and are disposed in the lower position (FIG. 19) in the bearing receiving apertures 218. In such a position, the connecting belts 252 and drive belts 266 may be placed around the bearings 230 and drive shafts 260 more easily as the connecting belts 252 and drive belts 266 do not have to be stretched as far and a user has easier access to the bearings 230. After the bearings 230 and drive shafts 260 have been connected, the attachment axles 246, bearings 230, and rollers 220 may be lifted in the bearing receiving apertures 218 to the upper position (FIG. 20). In the upper position, the third channel 244 of each bearing 230 may be substantially at the top of the respective bearing receiving apertures 218 such that the bearings 230 may be in an upper portion of the frame 204 near the top portion 208. In the upper position, the attachment axles 246 may be inserted through the bearing securement apertures 219 to retain the bearings 230 and rollers 220 in an operative position. In some embodiments, the attachment axles 246 are spring loaded such that force may be applied to the attachment axles 246 to compress the attachment axles 246 and, when the attachment axles 246, bearings 230, and rollers 220 are in position, the force may be removed, allowing the attachment axles 246 to extend through the bearing securement apertures 219. In some embodiments, the attachment axles 246 are secured on the distal side of the top distal portion 212 of the frame 204 by securement means, such as bolts, nuts, or other fasteners. The attachment axles 246 and rollers 220 may be similarly attached to the other frame 204 on the opposite side of the conveyor system 200.

While the attachment axles 246 are described as being disposed through the bearing securement apertures 219 when the attachment axles 246 are in the upper position, it will be appreciated that the attachment axles 246 may be disposed in the upper position in other suitable ways. For example, such as after the connecting belts 252 and drive belts 266 have been placed on the drive shaft 260 and bearings 230, the attachment axles 246, bearings 230, and rollers 220 may be lifted in the bearing receiving aperture 218 and the ends of the attachment axles 246 may be attached to or secured on an upper portion of the frame 204, such as the top distal portion 212, such as via a fastener, screw, or bolt, or the ends of the attachment axles 246 may be received in a holder or securement area configured in or attached to the frame 204, such as on a medial side of the top distal portion 212 of the frame 204, such as by applying a force to compress the attachment axles 246 and removing the force when the attachment axles 246 are aligned with the holder or securement area.

When the rollers 220, bearings 230, and attachment axles 246 are in the operative position, the drive belts 266 may be substantially taught and extend upwardly toward the connected rollers 220 and the connecting belts 252 may extend horizontally below the top portion 208 of the frame 204. The bearings 230 and connecting belts 252 may be at least partially covered and protected by the proximal portion 206, top portion 208, and top distal portion 212 of the frame 204. Further, the bearings 230, connecting belts 252, drive shafts 260, and drive belts 266 may be disposed proximally to the top and bottom distal portions 212, 214 of the frame 204 such that the bearings 230, connecting belts 252, drive shafts 260, and drive belts 266 are disposed between the proximal portion 206 of the frame 204 and the top and bottom distal portions 212, 214 of the frame 204.

Figure 18:
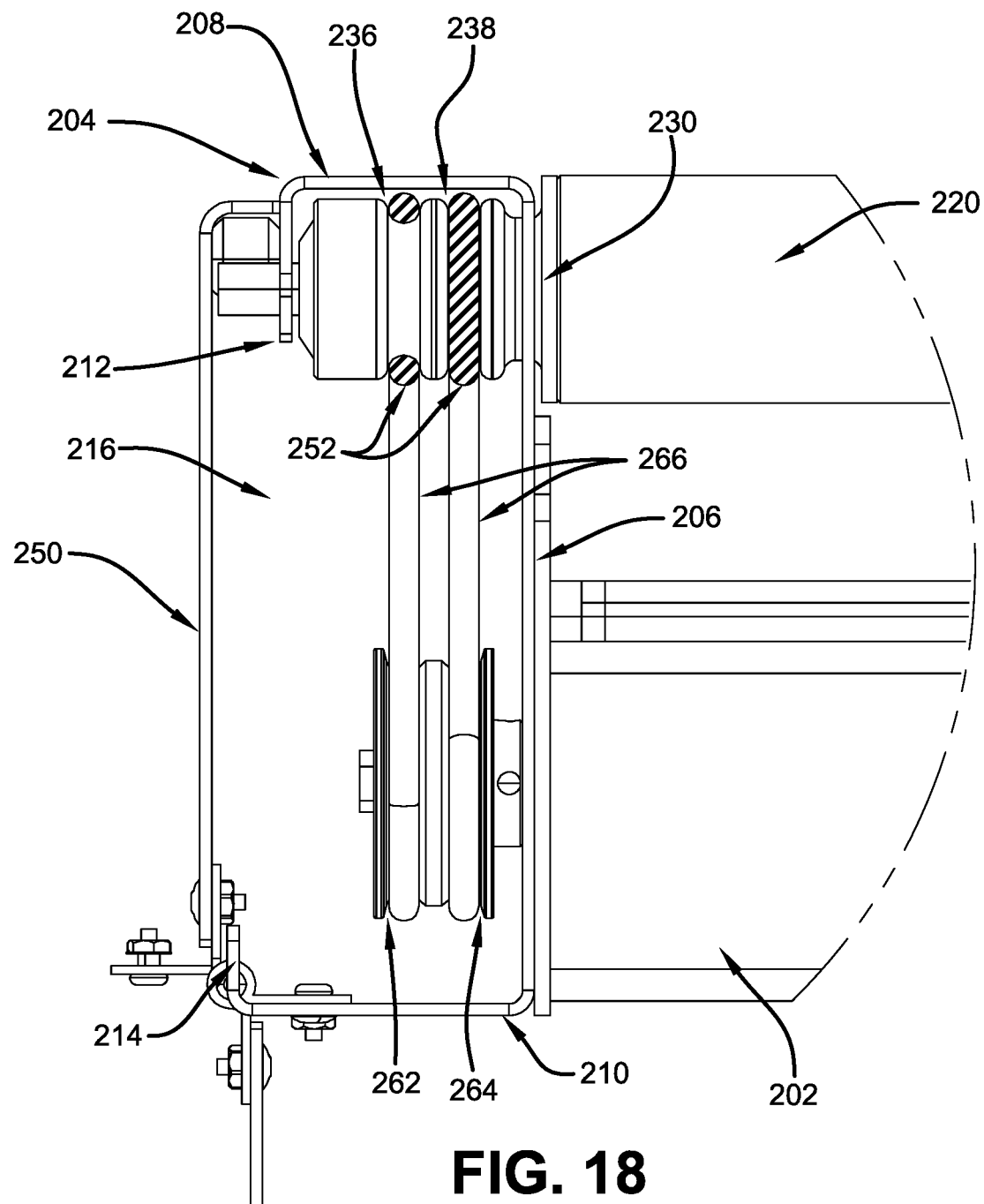
FIG. 18 illustrates a cut-away sectional view of area A shown in FIG. 9.

As shown in FIG. 18, the frame 204 may also include a cover 250 which may be attached to and substantially cover the frame opening 216 and protect the sides of the conveyor system 200. The cover 250 may extend a distance between the top distal portion 212 and the bottom distal portion 214 of the frame 204, substantially covering the frame opening 216. The cover 250 may be disposed on or otherwise affixed or attached to the top and bottom distal portions 212, 214 of the frame 204. For example, the top and bottom distal portions 212, 214 may have a plurality of attachment apertures extending along a length of the top and bottom distal portions 212, 214, respectively, and the cover 250 may also have a plurality of attachment apertures extending along the length of the cover 250 and corresponding to the attachment apertures in the top and bottom distal portions 212, 214. A fastener, such as a screw or bolt, may be fastened through the attachment apertures of the top distal portion 212 and the cover 250 and a fastener may be fastened through the attachment apertures of the bottom distal portion 214 and the cover 250, and the fasteners may be secured by a securement means, such as by a nut, washer, or bolt, In the illustrated embodiment, the fastener is inserted through the cover 250 and then the top or bottom distal portion 212, 214 and the nut is secured on the fastener in the space between the top and bottom distal portions 212, 214 and the proximal portion 206 of the frame 204. While the cover 250 is described as being attached to the top and bottom distal portions 212, 214 via fasteners, it will be appreciated that the cover 250 may be disposed on or otherwise affixed to the top and bottom distal portions 212, 214 by other means. For example, the cover 250 may be attached to the top and bottom distal portions 212, 214 by magnets, welding, or adhesives.

When the cover 250 is attached to the frame 204, the cover 250 may encase the bearings 230, connecting belts 252, drive shafts 260, and drive belts 266 within the frame 204. As such, the bearings 230, connecting belts 252, drive shafts 260, and drive belts 266 are disposed between the proximal portion 206, the top and bottom distal portions 212, 214, the cover 250, the top portion 208, the bottom portion 210. The cover 250 may also cover the attachment axles 246 retained in the bearing securement apertures 219. When attached, the cover 250 may prevent objects, such as articles of clothing, or body parts of users, such as hands or fingers, from getting caught or pinched between the rollers 220, bearings 230, drive shafts 260, connecting belts 252, and/or drive belts 266.

Figure 11:
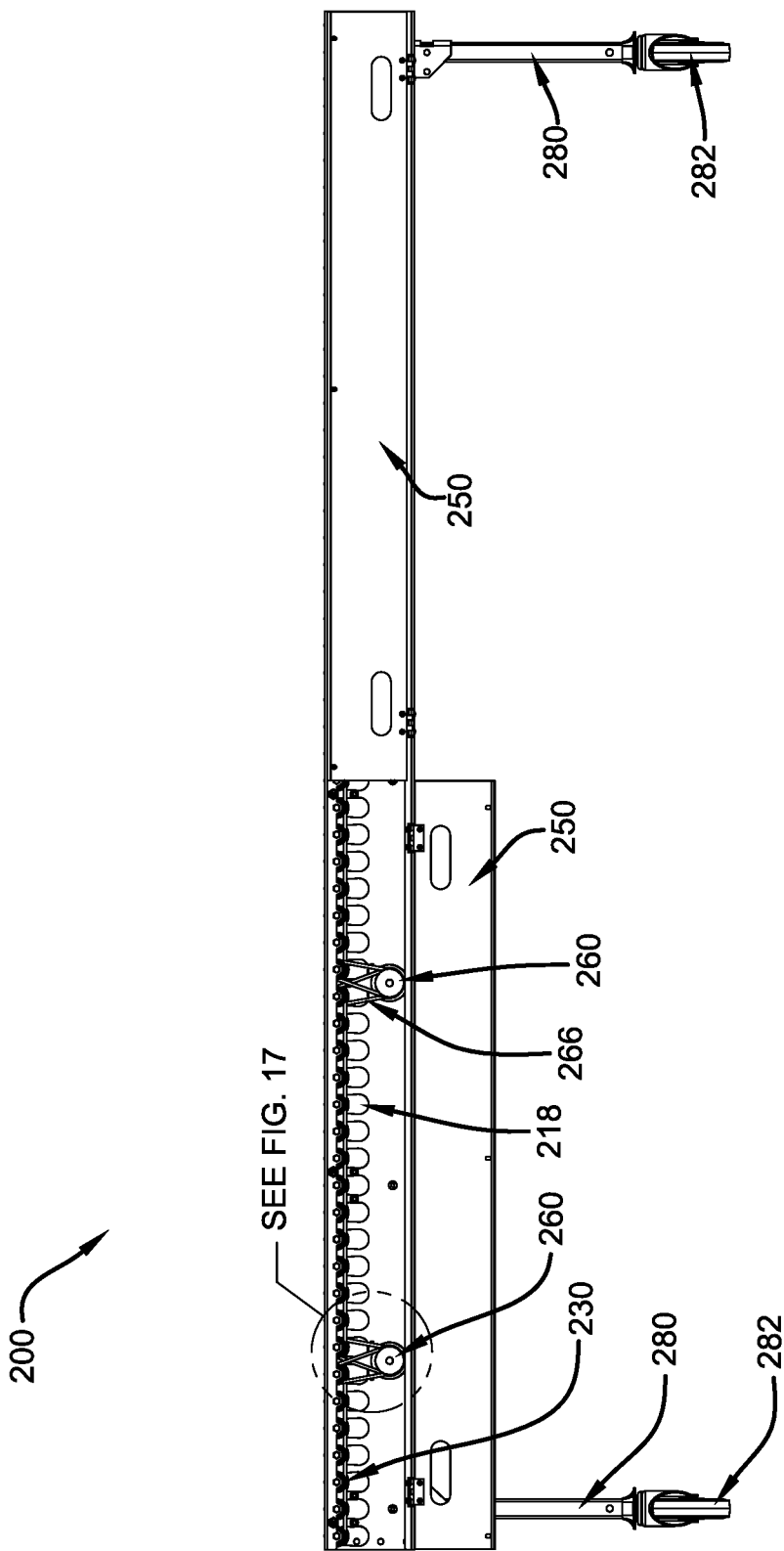
FIG. 11 illustrates a side view of the conveyor system of FIG. 9.
Figure 12:
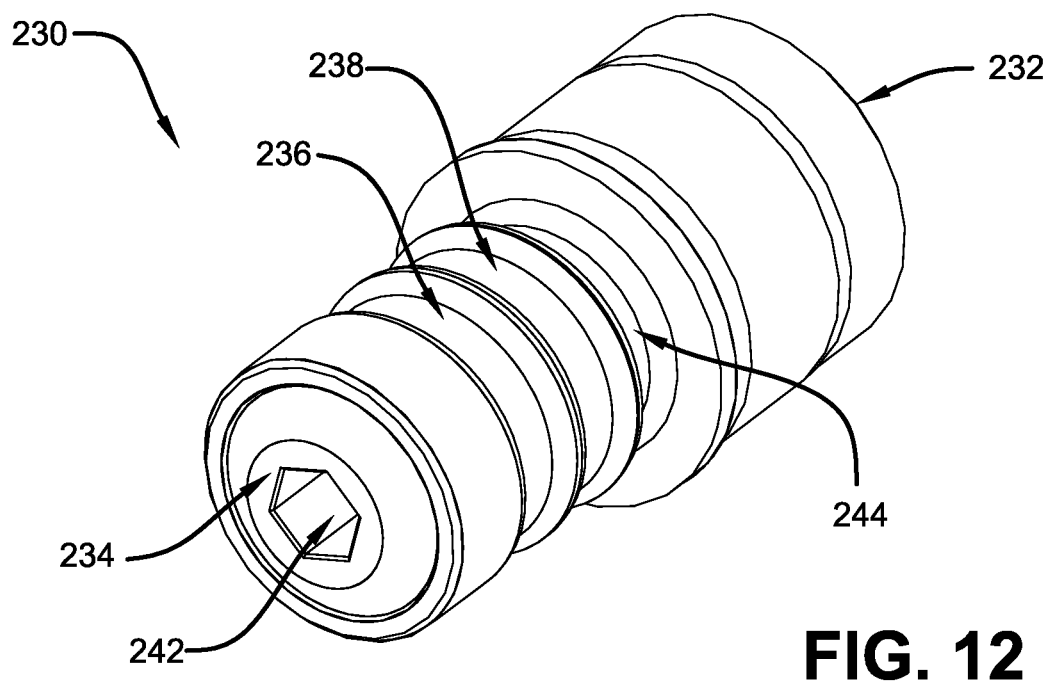
FIGS. 12 and 13 illustrate perspective views of a bearing for use in the conveyor system of FIG. 9.
Figure 13:
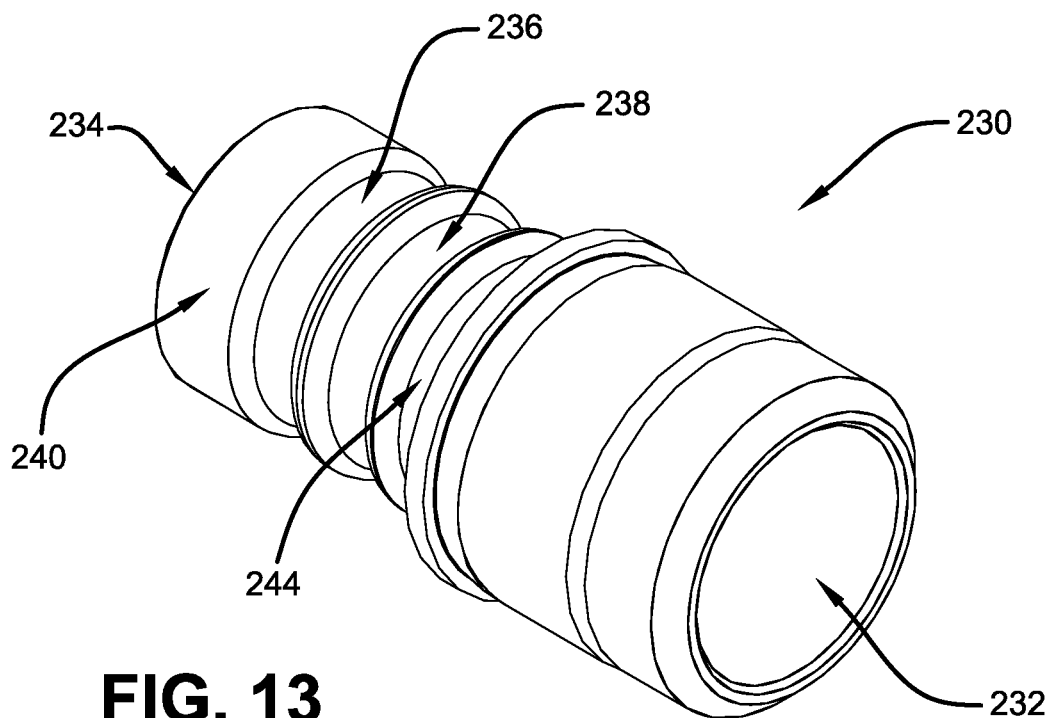
Figure 14:
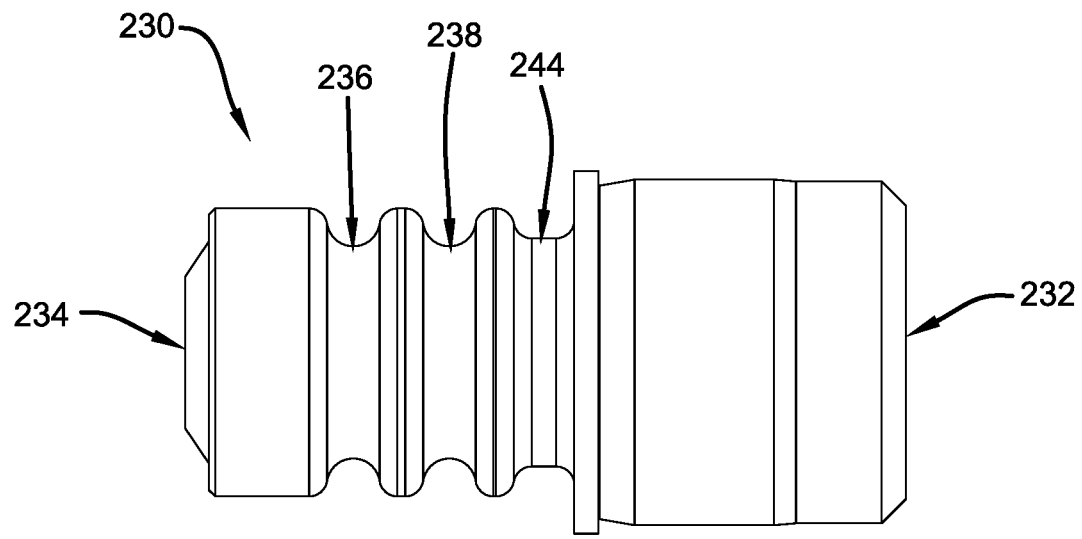
FIG. 14 illustrates a front view of the bearing of FIGS. 12 and 13.
Figure 15:
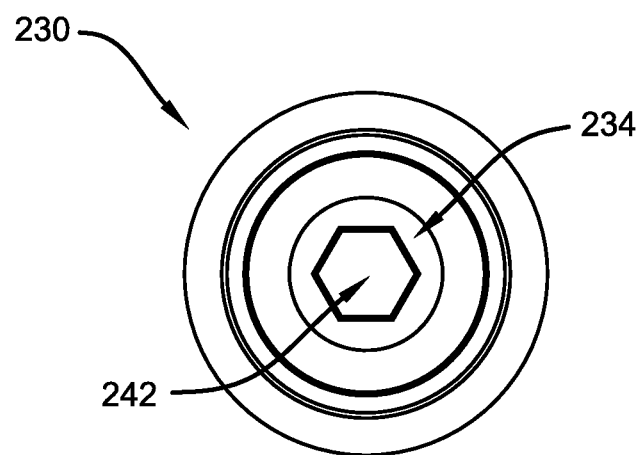
FIG. 15 illustrates a side view of the bearing of FIGS. 12 and 13.
Figure 17:
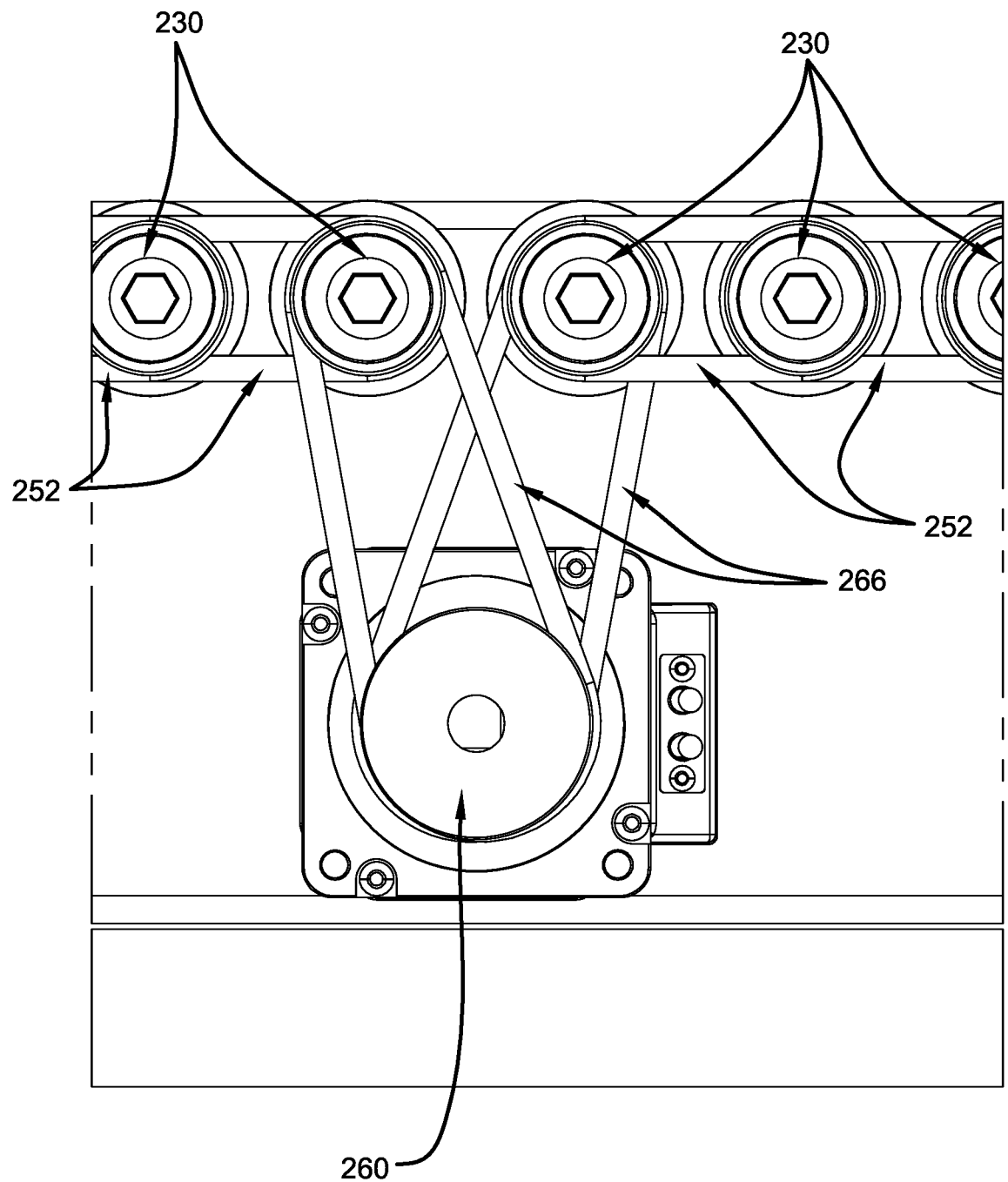
FIG. 17 illustrates a cut-away sectional view of area B shown in FIG. 11.

In some embodiments, such as shown in FIG. 11, the cover 250 may be detachable or pivotably connected to the frame 204. In such embodiments, at least a portion of the cover 250 may be disconnected so that the cover 250 may be removed or pivoted away from the frame 204 such that the frame opening 216 is exposed. While the cover 250 is removed or pivoted away from the frame 204, a user may access the bearings 230, connecting belts 252, drive shafts 260, and drive belts 266

Figure 9:
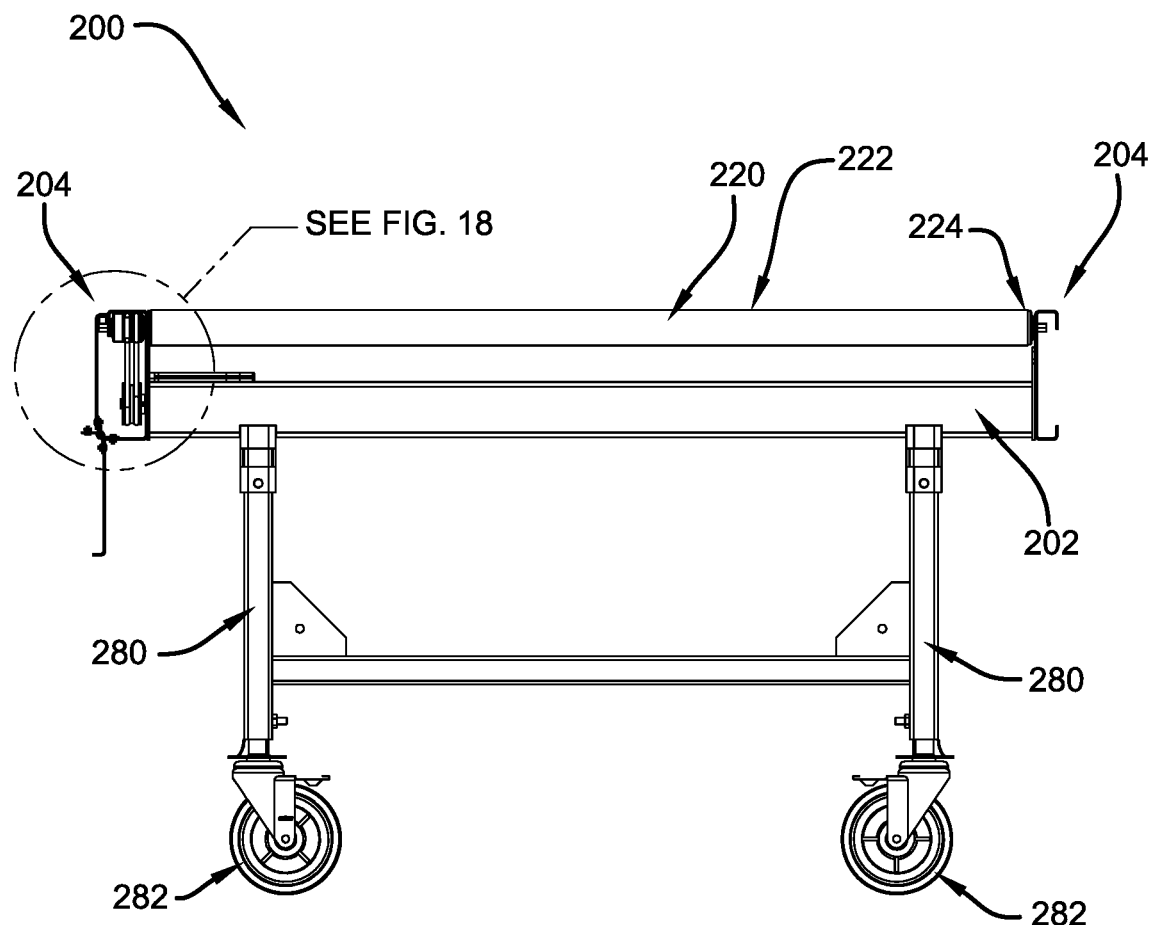
FIG. 9 illustrates a front view of a conveyor system according to another embodiment.
Figure 10:
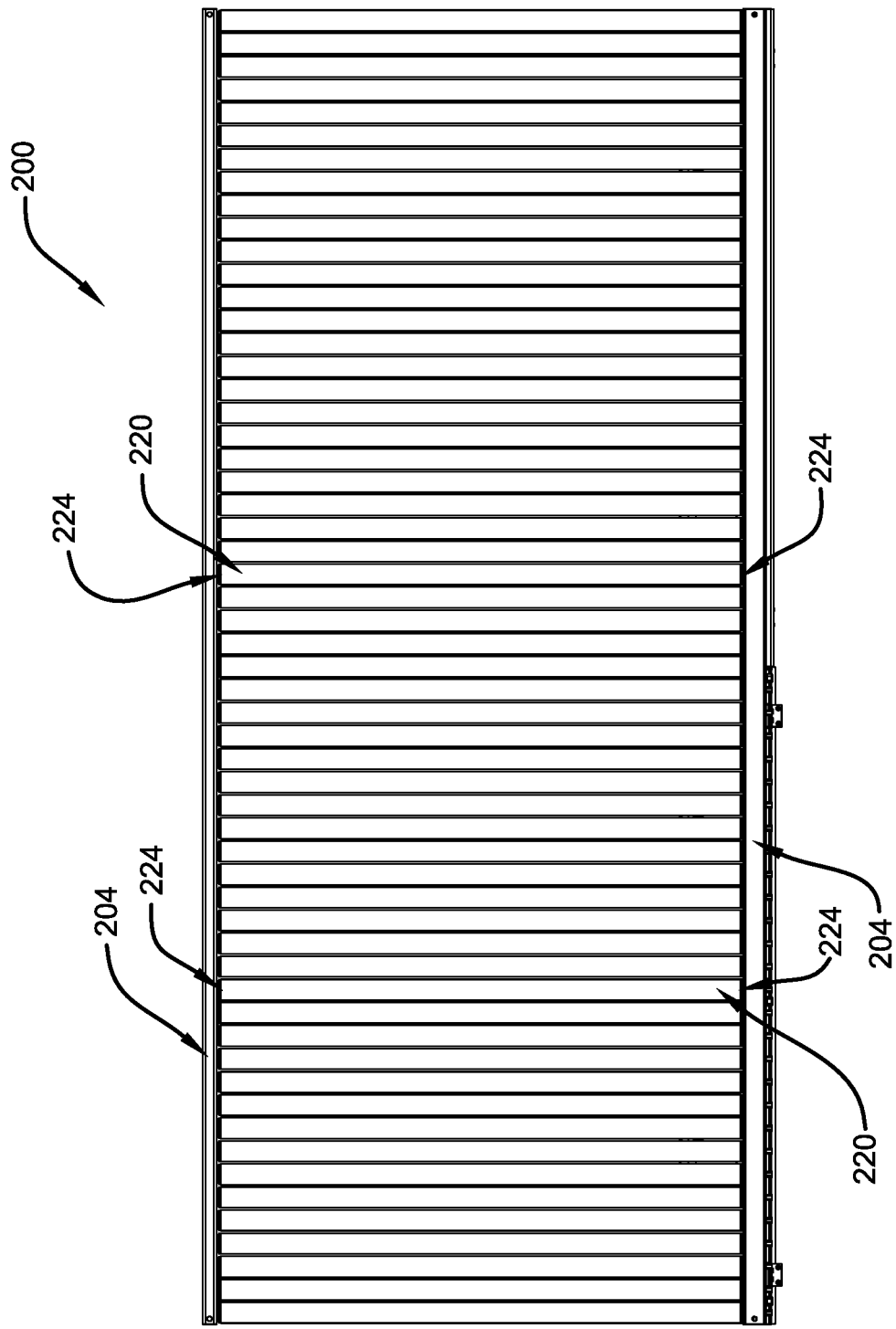
FIG. 10 illustrates a top view of the conveyor system of FIG. 9.

In some embodiments, such as shown in FIGS. 9 and 11, the conveyor system 200 also includes legs or supports 280 disposed on the underside of the base 202 to support the conveyor system 200 on a ground or floor. The legs or supports 280 may be sized such that a user may easily place an object or package on top of the rollers 220, such as when the user is in a standing position. The legs or supports 280 may be detachable and/or collapsible such that the conveyor system 200 may be moved or stored more easily. The legs or supports 280 may also include wheels 282 at the bottom of the legs or supports 280 such that the conveyor system 200 may be moved or otherwise positioned, such as by sliding the conveyor system 200 on the floor or ground.

The conveyor system 200 may also be combined with another conveyor system 200 similarly to the conveyor system 100 shown in FIGS. 7 and 8 such that an object or package may move along the rollers 220 of a first conveyor system 200 and then along the rollers 220 of a second conveyor system 200. The frames 204 and/or bases 202 of the two conveyor systems 200 may be attached together via fasteners, such as screws, nuts, and bolts. However, it will be appreciated that the two conveyor systems 200 may be attached via other suitable means, such as welding, magnets, or adhesives.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

The invention claimed is:

1. A conveyor system for conveying a package, the conveyor system comprising:
    a base;
    frames on opposite sides of the base;
    a plurality of rollers each having an outer circumference, a first end, and a second end;
    a bearing partially disposed in the first end of each roller and having a first channel and a second channel;
    a cap disposed in the second end of each roller;
    an attachment axle extending through each of the rollers, caps, and bearings configured to attach the rollers, caps, and bearings to each of the frames;
    a drive shaft; and
    a cover disposed on an outside portion of each of the frames;
    wherein the drive shaft is connected to one of the bearings via a first drive belt;
    wherein the bearings are press fit into the first ends of the rollers to secure the bearings in the rollers; and
    wherein the covers and frames are configured to prevent access to the first drive belt from lateral sides of the conveyor system.

2. The conveyor system according to claim 1, wherein the cover is pivotable between a first position and a second position, wherein the cover is attached to the frame in the first position and an inside of the frame is exposed when the cover is in the second position.

3. The conveyor system according to claim 1, wherein the drive shaft is disposed within one of the frames.

4. The conveyor system according claim 1, wherein the bearings of each roller in a roller section are chained together by connecting belts.

5. The conveyor system according to claim 1, wherein the drive shaft is connected to a second bearing via a second drive belt.

6. The conveyor system according to any one of claim 1, wherein the conveyor system is configured to be attached to a second conveyor system.

7. A bearing for use in a conveyor system, the bearing comprising:
   a first end;
   a second end opposite the first end;
   a first channel for receiving one of a first connecting belt and a first drive belt;
   a second channel for receiving one of a second connecting belt and second drive belt; and
   an attachment bore extending inwardly from the second end;
   wherein the first end may be press fit into an end of a roller to secure the bearing at least partially within the roller.

8. The bearing according to claim 7, further comprising a third channel, wherein the third channel is configured to retain the bearing in an upper position of a frame of a conveyor system.

9. The bearing according to claim 8, wherein the bearing is rotatable when the third channel retains the bearing in the upper position of the frame of the conveyor system.

10. The bearing according to claim 7, wherein the bearing may be disposed within an outer frame of a conveyor system.

11. The bearing according to claim 7, wherein the first and second channels are rounded.

12. The bearing according to claim 7, wherein the attachment bore is hexagonal.

13. A conveyor system for conveying packages, the conveyor system comprising:
   a base;
   frames on opposite sides of the base having a proximal portion, a top portion, a bottom portion, a top distal portion, and a bottom distal portion;
   a plurality of rollers each having an outer circumference, a first end, and a second end;
   a bearing partially disposed in the first end of each roller and having a first channel and a second channel;
   a cap disposed in the second end of each roller;
   an attachment axle extending through each of the rollers, caps, and bearings and configured to attach the rollers, caps, and bearings to each of the frames;
   a drive shaft; and
   a cover disposed on an outside portion of each of the frames;
   wherein the drive shaft is connected to one of the bearings via a first drive belt; and
   wherein the rollers are disposed between the frames and at least a portion of each of the bearings is disposed within one of the frames such that the drive belt is disposed within the frame; and
   wherein the rollers and bearings are moveable within the frame from a lower position to an upper position.

14. The conveyor system according to claim 13, wherein the drive shaft is disposed within the frame including the drive belt.

15. The conveyor system according to claim 13, wherein the bearings of each roller in a roller section are chained together by connecting belts.

16. The conveyor system according to claim 15, wherein the connecting belts are disposed within the frame including the drive belt.

17. The conveyor system according to claim 13, wherein the drive shaft is connected to a second bearing via a second drive belt.

18. The conveyor system according to claim 13, wherein the attachment axles are secured in the top distal portions of each of the frames.

19. The conveyor system according to claim 13, wherein the cover is pivotable between a first position and a second position, wherein the cover is attached to the frame in the first position and an inside of the frame is exposed when the cover is in the second position.

20. The conveyor system according to claim 13, wherein the frames each include a plurality of receiving apertures configured to operatively receive an end of one of the attachment axles.

* * * * *